United States Patent
Jung et al.

(10) Patent No.: US 11,665,752 B2
(45) Date of Patent: May 30, 2023

(54) METHOD AND APPARATUS FOR TRANSMITTING AND RECEIVING DATA IN WIRELESS COMMUNICATION SYSTEM

(71) Applicant: Samsung Electronics Co., Ltd., Gyeonggi-do (KR)

(72) Inventors: Byounghoon Jung, Gyeonggi-do (KR); Anil Agiwal, Gyeonggi-do (KR); Soenghun Kim, Gyeonggi-do (KR); Jaehyuk Jang, Gyeonggi-do (KR); Himke Van Der Velde, Zwolle (NL); Mangesh Abhimanyu Ingale, Bangalore (IN)

(73) Assignee: Samsung Electronics Co., Ltd

( * ) Notice: Subject to any disclaimer, the term of this patent is extended or adjusted under 35 U.S.C. 154(b) by 46 days.

(21) Appl. No.: 17/266,473

(22) PCT Filed: Aug. 8, 2019

(86) PCT No.: PCT/KR2019/009962
§ 371 (c)(1),
(2) Date: Feb. 5, 2021

(87) PCT Pub. No.: WO2020/032615
PCT Pub. Date: Feb. 13, 2020

(65) Prior Publication Data
US 2021/0315026 A1 Oct. 7, 2021

(30) Foreign Application Priority Data

Aug. 8, 2018 (KR) .................. 10-2018-0092560

(51) Int. Cl.
*H04W 74/08* (2009.01)
*H04W 24/10* (2009.01)
*H04W 56/00* (2009.01)

(52) U.S. Cl.
CPC ....... *H04W 74/0891* (2013.01); *H04W 24/10* (2013.01); *H04W 56/001* (2013.01); *H04W 74/0816* (2013.01)

(58) Field of Classification Search
CPC ......... H04W 74/0891; H04W 74/0816; H04W 74/0808; H04W 74/006; H04W 74/002;
(Continued)

(56) References Cited

U.S. PATENT DOCUMENTS

2017/0331577 A1    11/2017  Parkvall et al.
2018/0069660 A1    3/2018   Yi et al.
(Continued)

OTHER PUBLICATIONS

ZTE, "Considerations on DL Reference Signals and Channels Design for NR-U", R1-1806460, 3GPP TSG RAN WG1 Meeting #93, May 21-25, 2018, 7 pages.
(Continued)

*Primary Examiner* — Sudesh M Patidar
(74) *Attorney, Agent, or Firm* — The Farrell Law Firm, P.C.

(57) ABSTRACT

The present disclosure relates to a method and apparatus for transmitting and receiving data in a wireless communication system. A method of a base station for transmitting and receiving a synchronization signal includes performing listen-before-talk (LBT) on a channel of a terminal in an unlicensed band, and in case that the LBT succeeds within a window duration for transmitting a synchronization signal block (SSB), transmitting the SSB to the terminal, wherein the window duration includes at least one SSB burst length that is repeated in a specific period and has the specific period as a length of time, and the SSB is transmitted at a specific time within a first SSB burst length of the at least one SSB burst length.

9 Claims, 16 Drawing Sheets

(58) Field of Classification Search
CPC . H04W 74/08; H04W 74/0866; H04W 24/10; H04W 56/001
See application file for complete search history.

(56) References Cited

U.S. PATENT DOCUMENTS

| | | | |
|---|---|---|---|
| 2018/0123859 A1 | 5/2018 | Liu et al. | |
| 2018/0139712 A1 | 5/2018 | Abedini et al. | |
| 2018/0220458 A1* | 8/2018 | Ouchi | H04L 27/01 |
| 2019/0053281 A1* | 2/2019 | Åström et al. | H04W 56/0005 |
| 2019/0059106 A1* | 2/2019 | Zhang | H04W 48/16 |
| 2020/0037230 A1* | 1/2020 | Chen | H04J 11/0073 |
| 2020/0045696 A1* | 2/2020 | Huang | H04L 27/0006 |
| 2020/0396735 A1* | 12/2020 | Zhu | H04W 72/085 |
| 2021/0007065 A1* | 1/2021 | Ko | H04L 5/0051 |
| 2021/0120508 A1* | 4/2021 | Liu | H04W 72/005 |
| 2021/0153107 A1* | 5/2021 | Xu | H04W 72/04 |
| 2021/0176687 A1* | 6/2021 | Ko | H04W 36/04 |
| 2021/0307061 A1* | 9/2021 | Huang | H04W 74/006 |

OTHER PUBLICATIONS

ITL, "Broadcast Signals and Synchronization for NR-U", R1-1804591, 3GPP TSG RAN WG1 Meeting #92bis, Apr. 16-20, 2018, 5 pages.
Potevio, "Discussion on SSB Design for NR-U", R1-1807229, 3GPP TSG RAN WG1 Meeting #93, May 21-25, 2018, 3 pages.
International Search Report dated Nov. 19, 2019 issued in counterpart application No. PCT/KR2019/009962, 17 pages.
Convida Wireless, "Design Considerations for SSB in NR-U", R1-1807225, 3GPP TSG-RAN WG1 Meeting #93, May 21-25, 2018, 3 pages.
CATT, "NR SS Periodicity", R1-1700180, 3GPP TSG RAN WG1 NR Ad hoc Meeting, Jan. 16-20, 2017, 4 pages.
Vivo, "Discussion on the IDC Solutions for NR SA", R2-1809880, 3GPP TSG-RAN WG2 NR AH1807 Meeting, Jul. 2-6, 2018, 5 pages.
Qualcomm Incorporated, "IDC Indication for EN-DC", R2-1802609, 3GPP TSG-RAN WG2 Meeting #101, Feb. 26-Mar. 2, 2018, 3 pages.
Korean Office Action dated Mar. 21, 2022 issued in counterpart application No. 10-2018-0092560, 12 pages.
ZTE, Sanechips, "Framework on Potential Solutions and Techniques for NR-U", R1-1801466, 3GPP TSG RAN WG1 Meeting #92, Feb. 26-Mar. 2, 2018, 8 pages.
Qualcomm Incorporated, "DL Signals and Channels for NR-U", R1-1807387, 3GPP TSG RAN WG1 Meeting #93, May 21-25, 2018, 6 pages.
Huawei, HiSilicon, "Initial Access in NR Unlicensed", R1-1805920, 3GPP TSG RAN WG1 Meeting #93, May 21-25, 2018, 10 pages.
Korean Office Action dated Sep. 27, 2022 issued in counterpart application No. 10-2018-0092560, 12 pages.

* cited by examiner

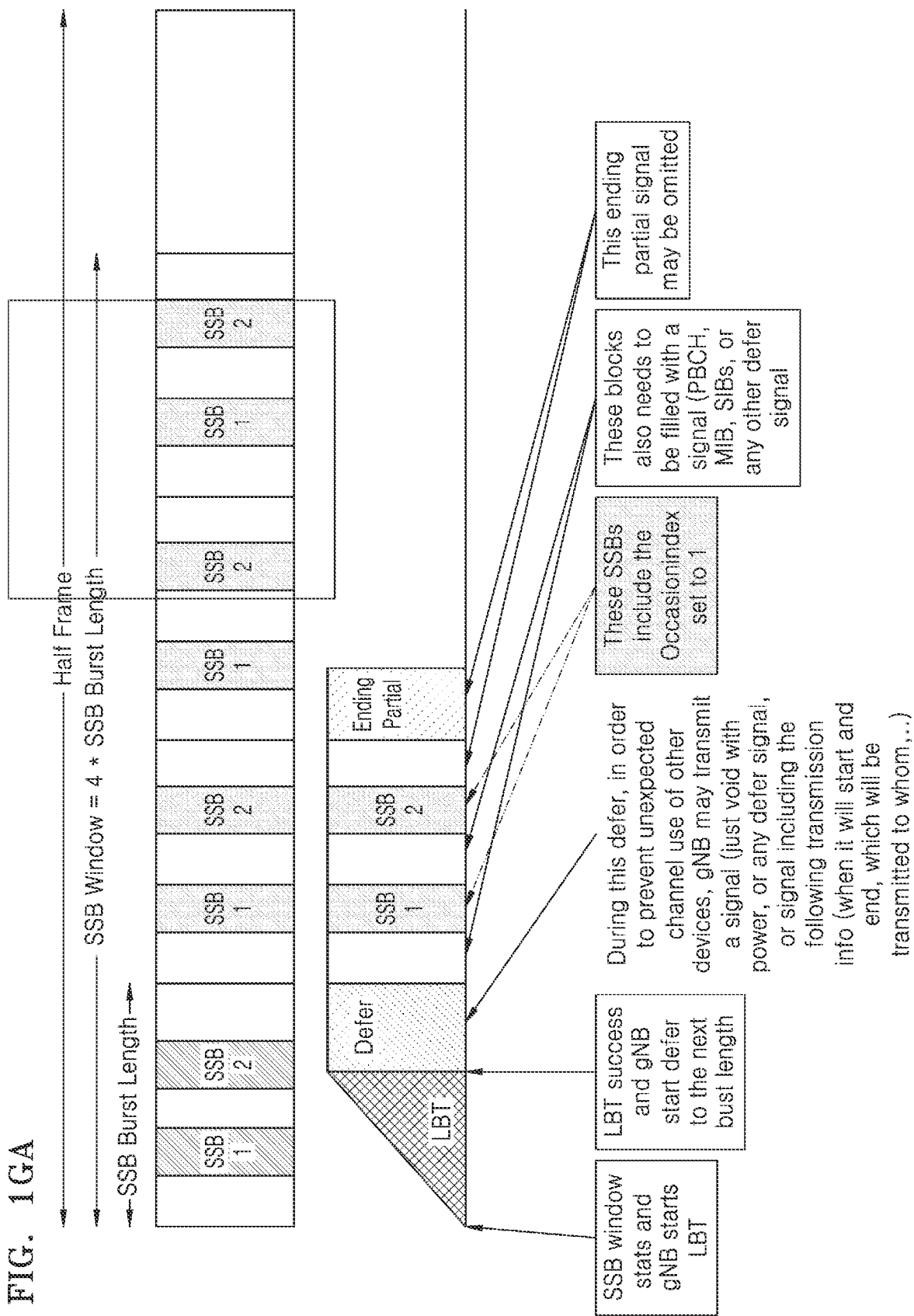

METHOD AND APPARATUS FOR TRANSMITTING AND RECEIVING DATA IN WIRELESS COMMUNICATION SYSTEM

PRIORITY

This application is a National Phase Entry of PCT International Application No. PCT/KR2019/009962, which was filed on Aug. 8, 2019, and claims priority to Korean Patent Application No. 10-2018-0092560, which was filed on Aug. 8, 2018, the entire content of each of which is incorporated herein by reference.

TECHNICAL FIELD

The present disclosure relates to a method and apparatus for transmitting/receiving data in a wireless communication system.

BACKGROUND ART

In order to meet the increasing demand with respect to wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called 'beyond 4G network communication systems' or 'post long term evolution (LTE) systems'. In order to achieve a high data rate, consideration is given to implementing 5G communication systems in millimeter wave (mmW) frequency bands (e.g., 60 GHz bands). In order to reduce propagation path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna. Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter-bank multi-carrier (FBMC), non-orthogonal multiple access (NOMA), or sparse code multiple access (SCMA) is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

In order to achieve a high data rate as considered in this patent, consideration is given to implementing 5G communication systems in millimeter wave (mmW) frequency bands (e.g., 60 GHz bands). In order to reduce propagation path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna.

Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway.

Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter-bank multi-carrier (FBMC), non-orthogonal multiple access (NOMA), or sparse code multiple access (SCMA) is underway.

In a communication system, a terminal needs an initial cell selection method and a cell reselection method in an idle mode for selecting the best base station to access. Also, in a connected mode, a terminal should perform radio resource management (RRM) management in order to perform handover to move to a better cell. As such, in order to select cells and compare the performance of the cells, each terminal should be able to observe or calculate a measured value representing each cell or a value derived from the measurement value. To this end, in existing LTE, different base stations reserve orthogonal resources in a shared frequency band using an omni-beam and transmit a cell specific reference signal of each cell by using the reserved orthogonal resources, and a terminal measures the cell specific reference signal and thus knows reference signal received power (RSRP) of each cell.

Also, in a next generation communication system considering beamforming, various methods by which different base stations transmit cell and beam specific reference signals on different resources by using different beams in rotation, and a terminal derives one representative value corresponding to a certain cell by using measured values of multiple beams transmitted in the cell, have been studied.

Although reference signal transmission using one beam or reference signal transmission using multiple beams has been studied, a case where base stations transmit two or more types of reference signals generated by different signal generation rules by using two or more types of beams having different beam areas, coverages, transmission periods, etc. has not been studied yet.

DESCRIPTION OF EMBODIMENTS

Solution to Problem

The present disclosure relates to a method and apparatus for transmitting/receiving data in a wireless communication system. A method of a base station for transmitting and receiving a synchronization signal may include performing listen-before-talk (LBT) on a channel of a terminal in an unlicensed band, and in case that the LBT succeeds within a window duration for transmitting a synchronization signal block (SSB), transmitting the SSB to the terminal, wherein the window duration includes at least one SSB burst length that is repeated in a specific period and has the specific period as a length of time, and the SSB is transmitted at a specific time within a first SSB burst length of the at least one SSB burst length.

BRIEF DESCRIPTION OF DRAWINGS

FIG. 1GB illustrates a method by which a base station transmits an SSB in an SSB burst length period, according to some embodiments of the present disclosure.

FIG. 1GC illustrates a method by which a base station transmits an SSB in an SSB burst length period, according to some embodiments of the present disclosure.

MODE OF DISCLOSURE

Figure 1A:
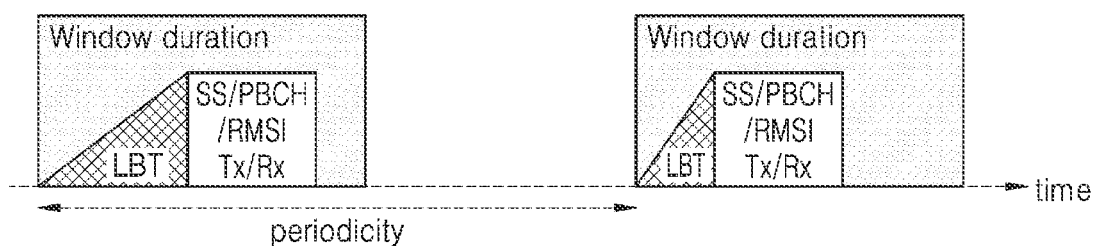
FIG. 1A is a diagram illustrating periodic synchronization signal transmission/reception configured with a window duration, according to some embodiments of the present disclosure.

Hereinafter, embodiments of the present disclosure will be described in detail with reference to the attached drawings. While describing the present disclosure, detailed descriptions of related well-known functions or configurations that may blur the points of the present disclosure are omitted. The terms used herein are those defined in consideration of functions in the present disclosure, but the terms may vary according to the intention of users or operators, precedents, etc. Therefore, the terms used herein have to be defined based on the meaning of the terms together with the description throughout the specification.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer usable or computer-readable memory that may direct a computer or other programmable data processing apparatus to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

The term "~ unit" used in the present embodiment refers to a software or hardware component, such as a field-programmable gate array (FPGA) or an application-specific integrated circuit (ASIC), which performs certain tasks. However, "~ unit" does not mean to be limited to software or hardware. The term "~ unit" may be configured to be in an addressable storage medium or configured to operate one or more processors. Thus, "~ unit" may include, byway of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Further, components and "~ units" may be implemented to operate one or more central processing units (CPUs) in a device or a secure multimedia card. Also, a unit in an embodiment may include one or more processors.

While describing the present disclosure, detailed descriptions of related well-known functions or configurations that may blur the points of the present disclosure are omitted. Hereinafter, an embodiment of the present disclosure will be described with reference to the drawings.

Hereinafter, terms indicating a connection node, terms indicating network entities, terms indicating messages, terms indicating an interface between network entities, and terms indicating various pieces of identification information used herein are exemplified for convenience of explanation. Accordingly, the present disclosure is not limited to the terms described below, but other terms indicating objects having equal technical meanings may be used.

Hereinafter, some terms and names defined in the $3^{rd}$ generation partnership project long term evolution (3GPP LTE) standard may be used for convenience of explanation. However, the present disclosure may not be limited to the terms and names, and may also be applied to systems following other standards. In the present disclosure, an evolved node B (eNB) may be interchangeably used with a next generation node B (gNB) for convenience of explanation. That is, a base station described as an eNB may refer to a gNB. Also, the term "terminal" may refer to other wireless communication devices as well as mobile phones, NB-IoT devices, and sensors.

Hereinafter, a base station is an entity performing resource allocation for a terminal and may include at least one of a gNode B, an eNode B, a Node B, a base station (BS), a radio access unit, a base station controller, and a node on a network. A terminal may include a user equipment (UE), a mobile station (MS), a cellular phone, a smartphone, a computer, or a multimedia system capable of performing a communication function. However, the present disclosure is not limited to the above examples.

In particular, the present disclosure may be applied to 3GPP NR (5G mobile communication standard). Also, the present disclosure may be applied to intelligent services based on 5G communication technology and Internet of Things (IoT)-related technology (e.g., smart home, smart building, smart city, smart car or connected car, health care, digital education, retail business, security, and safety-related services). In the present disclosure, an eNB may be interchangeably used with a gNB for convenience of explanation. That is, a base station described as an eNB may refer to a gNB. Also, the term "terminal" may refer to other wireless communication devices as well as mobile phones, NB-IoT devices, and sensors.

A wireless communication system has developed beyond the initially provided voice-based service into a broadband wireless communication system that provides a high speed and high quality packet data service, using communication standards such as high-speed packet access (HSPA) of $3^{rd}$ generation partnership project (3GPP), long term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and 802.16e of Institute of Electrical and Electronics Engineers (IEEE).

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a terminal (e.g., a user equipment (UE) or a mobile station (MS)) transmits data or a control signal to a base station (e.g., an eNode B), and the downlink is a radio link through which the base station transmits data or a control signal to the terminal. In the multi-access scheme described above, time-frequency resources for carrying data or control information are allocated and operated in a manner to prevent overlapping of the resources, i.e., to establish orthogonality between users so as to identify data or control information of each user.

As future communication systems after LTE, 5G communication systems should be able to freely reflect requirements of users and service providers, and thus services simultaneously satisfying the various requirements should be supported. Services considered for 5G communication systems include enhanced mobile broadband (eMBB), massive machine type communication (mMTC), and ultra-reliable low-latency communication (URLLC).

According to some embodiments, eMBB may aim to provide a higher data rate than a data rate supported by LTE, LTE-A, or LTE-Pro. For example, in a 5G communication system, eMBB should be able to provide a peak data rate of 20 gigabits per second (Gbps) in a downlink and a peak data rate of 10 Gbps in an uplink with respect to one base station. Furthermore, the 5G communication system should be able to provide an increased user-perceived data rate of a terminal while providing the peak data rate. In order to satisfy such requirements, in the 5G communication system, various transmission and reception technologies including a further enhanced MIMO transmission technology must be improved. Furthermore, an LTE system transmits a signal by using a maximum transmission bandwidth of 20 megahertz (MHz) in a frequency band of 2 gigahertz (GHz). In contrast, the 5G communication system transmits a signal by using a frequency bandwidth wider than 20 MHz in a frequency band of 3 to 6 GHz or more, and thus may satisfy the data rate requirements necessary for the 5G communication system.

Furthermore, in the 5G communication system, mMTC is considered to support application services such as Internet of Things (IoT). In order for mMTC to efficiently provide the IoT, access by many terminals within a single cell, coverage improvement of a terminal, an increased battery time, a reduction in the cost of a terminal, etc. may be required. The IoT is attached to various sensors and various devices to provide a communication function, and thus should be able to support many terminals (e.g., 1,000,000 terminals/km$^2$) within a cell. Furthermore, because a terminal supporting mMTC is likely to be located in a shaded area that a cell does not cover such as in the basement of a building, wider coverage than other services provided by the 5G communication system may be required. Because the terminal supporting mMTC should include a cheap terminal and it is difficult to replace a battery of the terminal frequently, a very long battery life time (e.g., 10-15 years) may be required.

Lastly, URLLC is a cellular-based wireless communication service used for mission-critical purposes, and may be used in remote control of robots or machinery, industrial automation, unmanned aerial vehicles, remote health care, emergency alert, etc. Accordingly, communication provided by URLLC may have to provide very low latency (ultra-low latency) and very high reliability (ultra-high reliability). For example, services supporting URLLC should meet an air interface latency of less than 0.5 milliseconds and have a packet error rate of 10-5 or less. Accordingly, for services supporting URLLC, the 5G system should provide a transmission time interval (TTI) less than that of other services, and a design for broad resource allocation in a frequency band in order to ensure the reliability of a communication link may be required.

Three services considered for the 5G system, that is, eMBB, URLLC, and mMTC, may be multiplexed and transmitted in one system. In order to satisfy different requirements of the services, different transmission and reception schemes and transmission/reception parameters may be used between the services. However, the mMTC, URLLC, and eMBB are examples of different service types, and service types to which the present disclosure is applied are not limited thereto.

Also, although embodiments of the present disclosure will be described based on an LTE, LTE-A, LTE Pro, or 5G (or NR, next generation mobile communication) system, the embodiments of the present disclosure may be applied to other communication systems having a similar technical background or channel type. Also, the embodiments of the present disclosure may be applied to other communication systems through some modifications without departing from the scope of the present disclosure based on a determination by one of ordinary skill in the art.

The present disclosure relates to a next generation wireless communication system, and provides a system, method, and apparatus by which, in a system including one or more base stations and one or more terminals and using an unlicensed band, a base station and a terminal which should perform channel sensing before transmission to coexist with radio transmission technologies using other unlicensed bands effectively transmit and receive a synchronization signal.

Also, the present disclosure relates to a next generation wireless communication system, and provides a system, method, and apparatus by which, in a system including one or more base stations and one or more terminals, a terminal performs a method of finding an in-device coexistence (IDC) problem that may not be solved by the terminal itself related to a bandwidth part (BWP), dual connectivity (DC), or supplementary uplink (SUL) and reporting the IDC problem to a network.

Also, the terminal may transmit any information architecture (information elements) to notify its capability to the network, and the information architecture may include an indicator indicating that the terminal is able to determine the IDC problem related to BWP, DC, or SUL and transmit information on the IDC problem to the network.

Because a system that performs wireless communication in an unlicensed band should inevitably share a frequency band with other unlicensed wireless communication terminals and base stations (e.g., wireless local area network (LAN), Bluetooth, or LTE licensed assisted access (LAA) terminals), wireless transmission in the unlicensed band may require contention for resource occupation. Accordingly, in order to prevent collisions caused by transmission of different terminals in the contention, listen-before-talk (LBT) is used to check a channel condition before transmission. Due to channel occupation of another terminal and LBT performed by the other terminal, even when a future specific transmission time is reserved in the unlicensed band, it may not be easy to definitely succeed in transmission at the specific transmission time. Accordingly, in order to solve such problems, it may be preferable to reserve a window duration that starts at a specific point of time and lasts for a certain period of time and to attempt to perform transmission and reception within the window duration, rather than reserving a specific point of time between a transmitting end and a receiving end.

FIG. 1A is a diagram illustrating periodic synchronization signal transmission/reception configured with a window duration, according to some embodiments of the present disclosure.

Referring to FIG. 1A, a base station may start a synchronization signal transmission window duration from a specific time according to a configured period, and may attempt to perform LBT and synchronization signal transmission while the window duration continues. When transmission succeeds within the window duration or transmission does not succeed but the window duration ends, the base station may wait for a window duration that starts in a next period.

Because the synchronization signal transmission of the base station should be recognized even when a terminal is not connected to the base station, the terminal should be able to recognize information on the synchronization signal transmission even with only one synchronization signal detection. Accordingly, the information on the synchronization signal transmission should be included in any synchronization signal block.

In a next generation wireless communication system, a synchronization signal block obtained by packing a primary synchronization signal (PSS), a secondary synchronization signal (SSS), a master information bit (MIB), a secondary information bit (SIB), a demodulation reference signal (DMRS), and a PBCH payload may be transmitted in adjacent different OFDM symbols and frequency bands as follows.

Figure 1B:
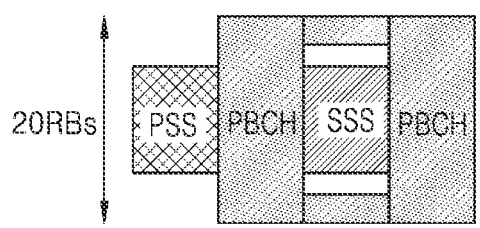
FIG. 1B illustrates a synchronization signal block (SSB) according to some embodiments of the present disclosure.

FIG. 1B illustrates a synchronization signal block (SSB) according to some embodiments of the present disclosure.

A base station may include, in an SSB, periodicity information of a synchronization signal, and synchronization signal transmission window duration information and may transmit the same. The base station may include the periodicity information of the synchronization signal in a PSS, SSS, MIB, SIB1, or SIB2 and may transmit the same as follows.

-- The SSB periodicity in msec for the rate matching purpose (see 38.211, section {7.4.3.1})
ssb-PeriodicityServingCell         ENUMERATED {ms5, ms10, ms20, ms40, ms80, ms160, spare1, spare2}, Also, the base station may include the synchronization signal transmission window duration information in the PSS, SSS, MIB, SIB1, or SIB2 and may transmit the same as follows.

-- Duration of the measurement window in which to receive SS/PBCH blocks.
duration                           ENUMERATED { FFS }

According to some embodiments, the base station may set a length of a window duration as a multiple of a subframe, a multiple of a half-frame, a multiple of a slot, a multiple of an OFDM symbol, or a multiple of a specific period (e.g., a time required to transmit SSBs for all beams).

Figure 1C:
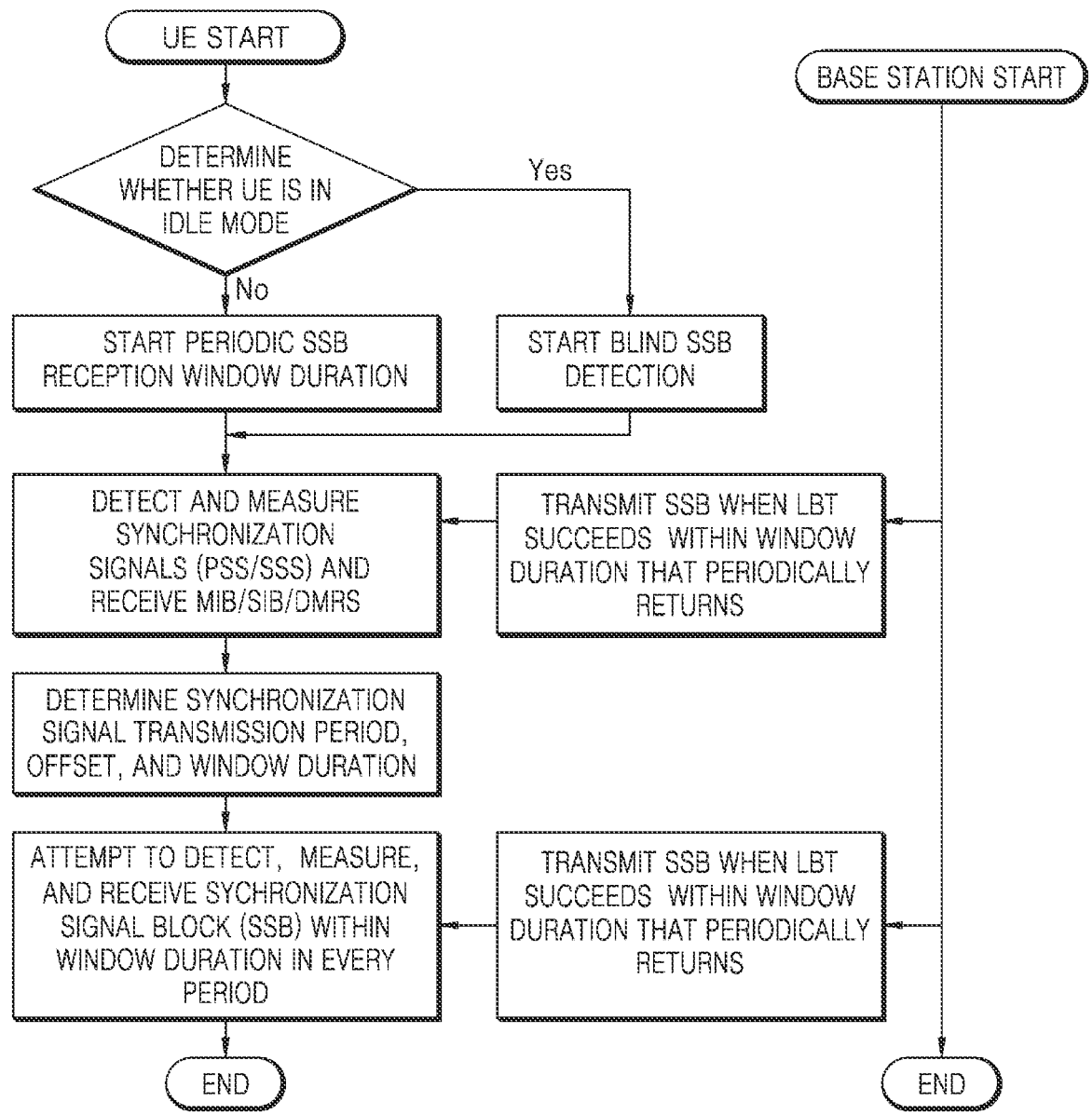
FIG. 1C is a flowchart illustrating a periodic SSB transmission and reception method using a synchronization signal transmission window duration in an unlicensed band, according to some embodiments of the present disclosure.

FIG. 1C is a flowchart illustrating a periodic SSB transmission and reception method using a synchronization signal transmission window duration in an unlicensed band, according to some embodiments of the present disclosure.

When a UE is not in an idle mode, the UE may start SSB reception for receiving an SSB that is periodically transmitted by a base station. When the UE is in an idle mode, the UE may start blind SSB detection. When LBT succeeds within a window duration that periodically returns, the base station may transmit an SSB to the UE. The UE may receive the SSB transmitted by the base station, may detect and measure synchronization signals (PSS and SSS) through the received SSB, and may receive an MIB, an SIB, and a DMRS.

The UE may determine a synchronization signal transmission period, a synchronization signal offset, and a window duration through the received SSB.

The UE and the base station may repeatedly perform the above process in every SSB transmission/reception period.

Figure 1D:
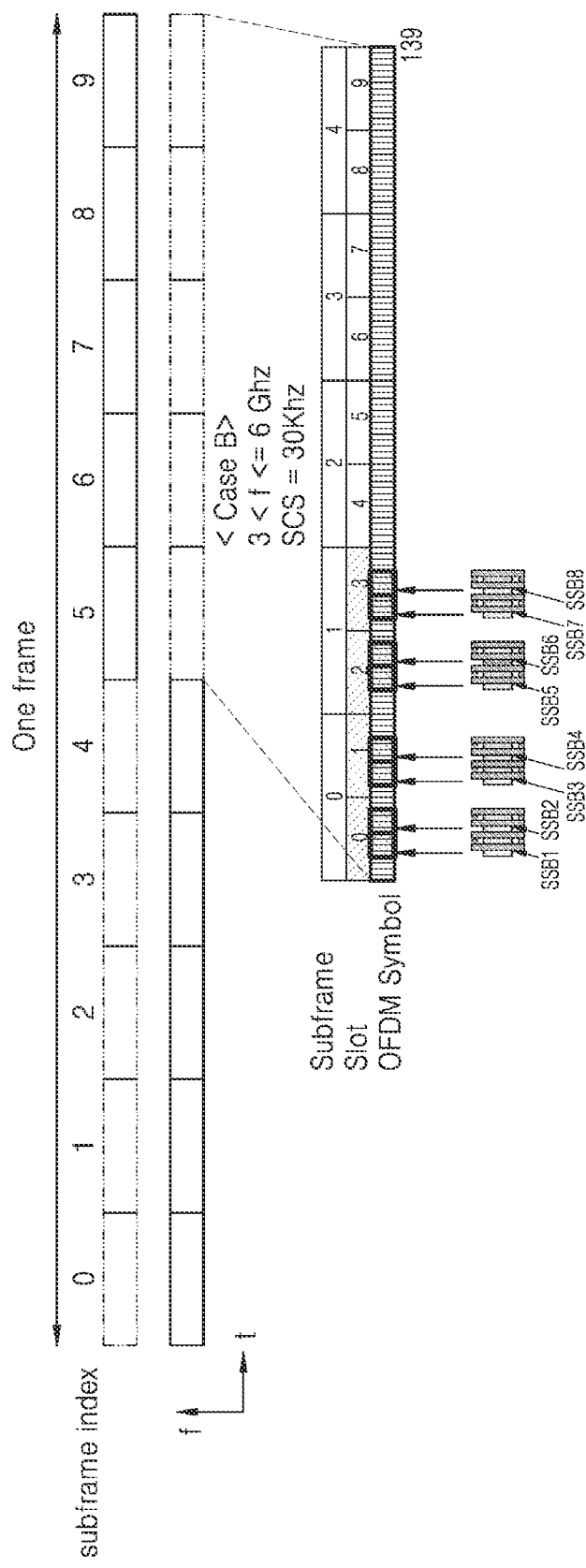
FIGS. 1D and 1E are diagrams illustrating SSB transmission of a base station in new radio (NR) according to some embodiments of the present disclosure.
Figure 1E:
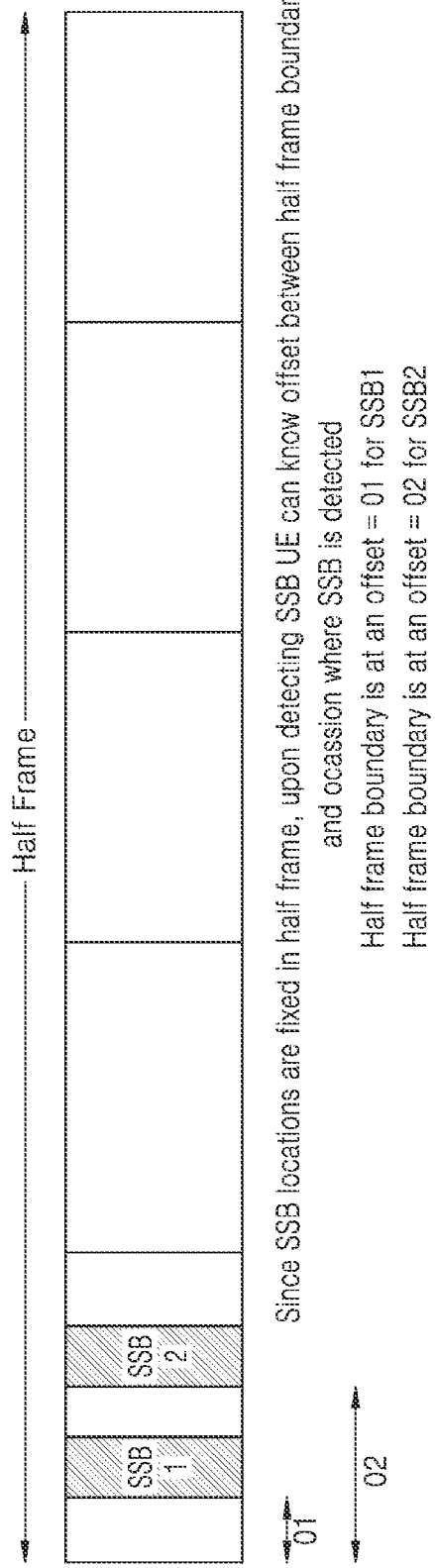

FIGS. 1D and 1E are diagrams illustrating SSB transmission of a base station in NR according to some embodiments of the present disclosure.

In an unlicensed band, unlike in a licensed band such as LTE or NR, the base station may not be able to transmit an SSB at a fixed time. For example, referring to FIG. 1D, the base station may be able to transmit a specific SSB only at a certain fixed OFDM symbol location within a frame in the NR. A frame structure of a case where a base station simply transmits SSB1 and SSB2 according to some embodiments is illustrated in FIG. 1E.

Figure 1F:
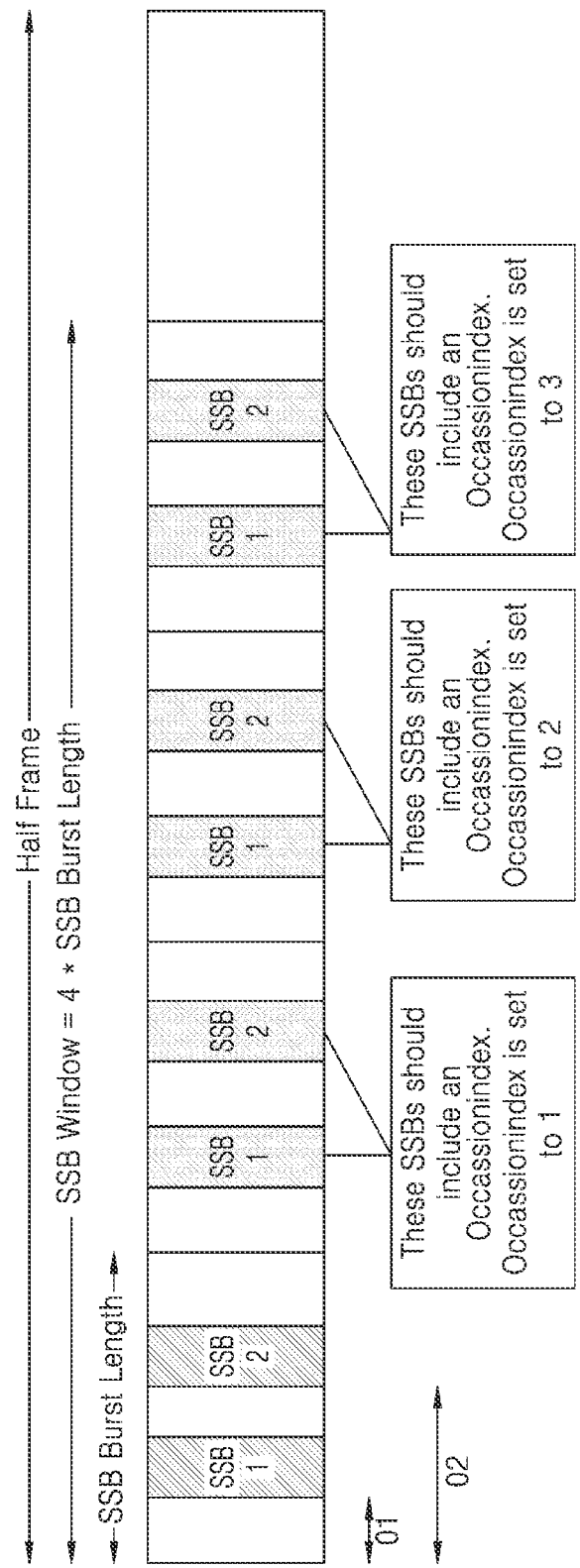
FIG. 1F illustrates SSBs transmitted by a base station in different SSB burst lengths, and an Occationindex transmitted by being included in the SSBs included in the SSBs, according to some embodiments of the present disclosure.

FIG. 1F illustrates SSBs transmitted in different SSB burst lengths by a base station, and an Occationindex transmitted by being included in the SSBs, according to some embodiments of the present disclosure.

In an unlicensed wireless communication system, SSB transmission may be possible only when a window is used and LBT succeeds. Accordingly, in the unlicensed wireless communication system, when a base station may be able to transmit an SSB only at a fixed location within a radio frame, SSB transmission may not be possible. This is because when LBT does not succeed before the location within a window duration, a terminal should wait for a next period, and there is no guarantee that LBT will succeed before the location of the SSB within a window duration of the next period.

According to the present disclosure, a period for completing SSB transmission is defined as an SSB burst length and SSBs having the same offsets (e.g., 01 and 02 of FIG. 1E) are transmitted in every corresponding period. A base station may set an SSB transmission location as a multiple of the SSB burst length, and may also set a window duration provided to a terminal as a multiple of the SSB burst length.

In this case, in order for the terminal to appropriately identify a half-frame and a radio frame boundary, the base station should notify the terminal of information on which repeated SSB burst length a transmitted SSB belongs to, and the information may be referred to as an Occasionindex. The base station may include the Occasionindex in PSS/SSS/PBCH/DMRS/MIB/SIB/PBCH payload in the SSB and may transmit the same to the terminal.

Figure 1G:
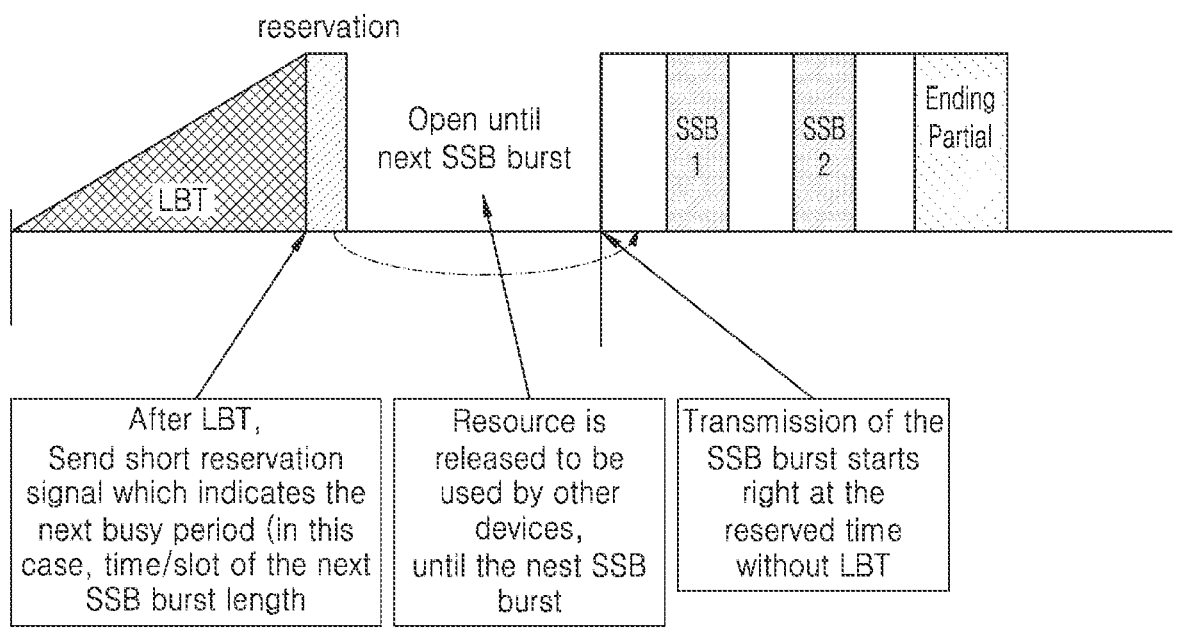
FIG. 1GA illustrates a method by which a base station transmits an SSB in an SSB burst length period, according to some embodiments of the present disclosure.
Figure 1G:
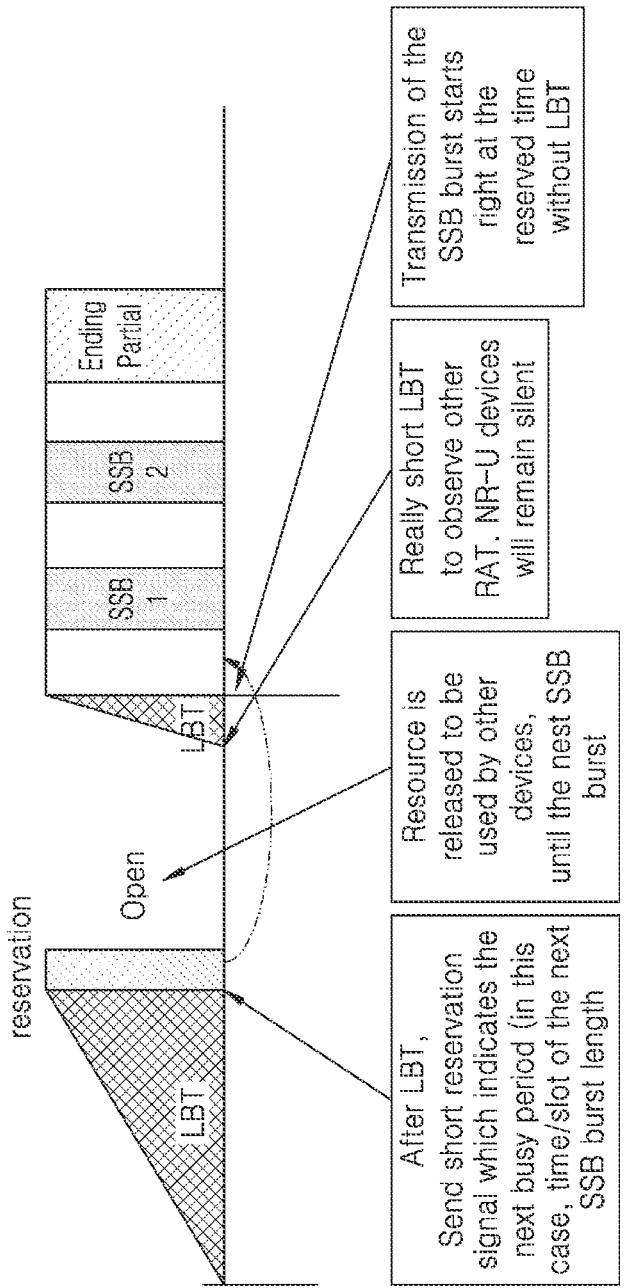

FIG. 1GA illustrates a method by which a base station transmits an SSB in an SSB burst length period, according to some embodiments of the present disclosure.

Referring to FIG. 1GA, a base station attempting to perform SSB transmission having four SSB burst lengths as a window duration attempted to perform LBT within the window duration and succeeded in the LBT before a first SSB burst length ends. However, because a point of time when the base station succeeded in the LBT is already late to start SSB transmission, the base station waits for a next SSB burst length and transmits a defer signal. The defer signal may be a channel occupation signal for preventing channel occupation of other terminals, and the base station may select one of the following signals and may transmit the selected signal as the defer signal.

Power signal only with noise
Specific defer signal that is broadcast
Specific defer signal transmitted to a specific terminal
Specific data signal transmitted to a specific terminal Referring to FIG. 1GA, when defer signal transmission ends and a new SSB burst length starts, the base station transmits SSBs including an appropriate Occasionindex at pre-determined locations. After all transmissions are finished, the base station may notify that SSB transmission ends by transmitting an ending partial signal to the terminal.

FIG. 1GB illustrates a method by which a base station transmits an SSB in an SSB burst length period, according to some embodiments of the present disclosure. FIG. 1GA may be another embodiment of FIG. 1GA.

In FIG. 1GB, a base station may transmit a reservation signal, instead of transmitting a defer signal for a long waiting time, and may release a resource to be used by other terminals or radio access technologies (RATs).

The reservation signal transmitted by the base station may include information on an entity that reserves the resource (e.g., cell ID, public land mobile network (PLMN) info, or resource request channel (RRCH) ID), and may include information on a point of time when reservation is to be executed (e.g., an OFDM symbol number, a subframe number (SFN), or a slot number from which a next SSB burst length starts). Alternatively, duration information for which the resource is open may be included as a multiple of a subframe, a slot, or an OFDM symbol in the reservation signal transmitted by the base station.

FIG. 1GC illustrates a method by which a base station transmits an SSB in an SSB burst length period, according to some embodiments of the present disclosure. FIG. 1GC may be another embodiment of FIG. 1GB.

In FIG. 1GC, a base station may transmit a reservation signal, instead of transmitting a defer signal for a long waiting time, and may release a resource to be used by other terminals or other RATs. A difference between an embodiment of FIG. 1GC and an embodiment of FIG. 1GC is that, in FIG. 1GC, when a reservation time approaches, the base station performs very short LBT in advance to check once more whether a channel is available. Because an unlicensed resource may be used not only by LTE LAA and NR-unlicensed but also by various other wireless communication systems such as WLAN, Bluetooth, and Zigbee, it is necessary to keep in mind the possibility that there may be systems that occupy and use the resource without understanding information of the reservation signal. Accordingly, despite making a reservation, the base station performs LBT for safe transmission before actually transmitting information, and when the resource is occupied by other systems, the base station waits for a next opportunity.

Figure 1H:
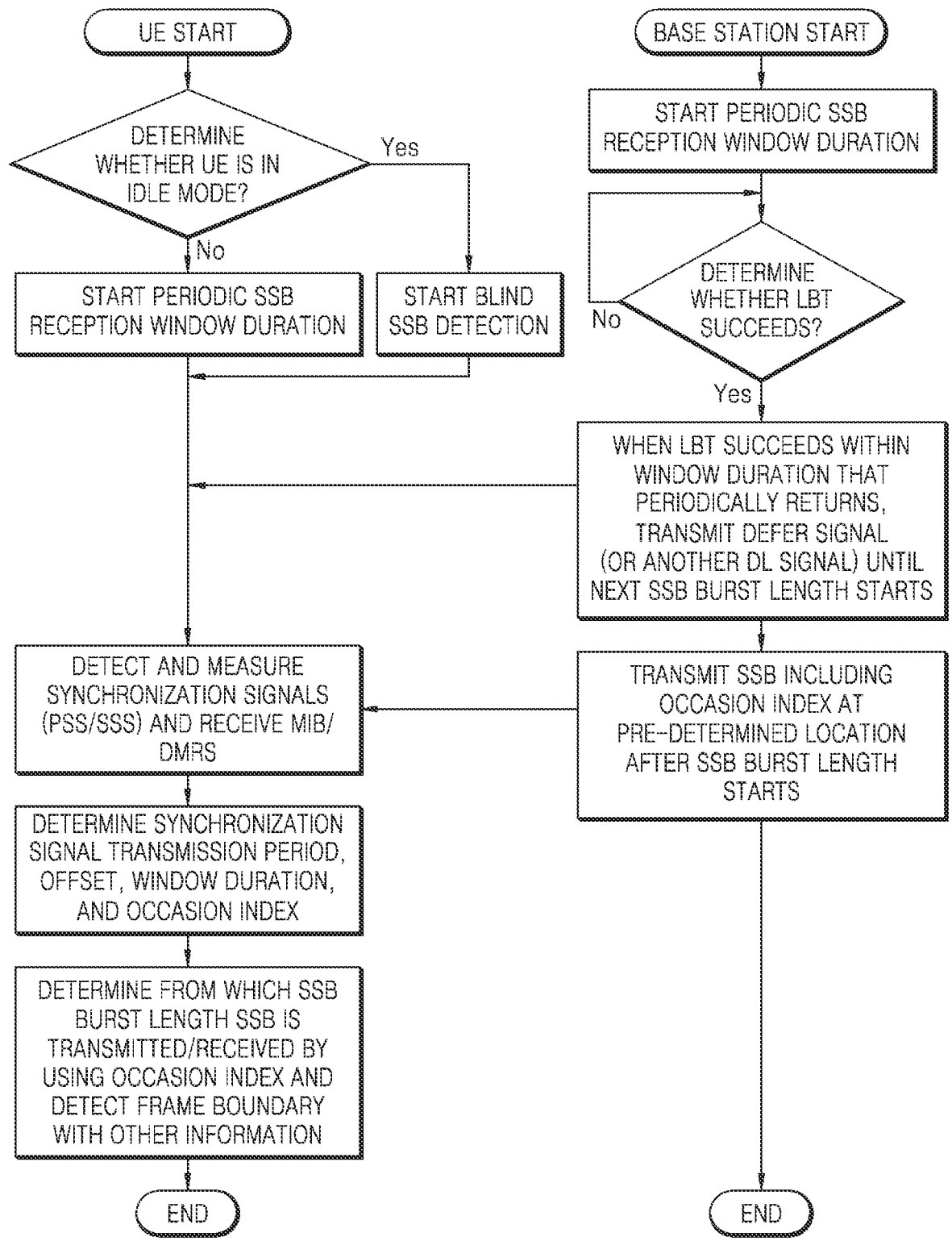
FIG. 1H illustrates an SSB transmission/reception method in an unlicensed band using an SSB burst length of a base station, according to some embodiments of the present disclosure.

FIG. 1H illustrates an SSB transmission/reception method in an unlicensed band using an SSB burst length of a base station, according to some embodiments of the present disclosure.

When a terminal is not in an idle mode, the terminal may start SSB reception for receiving an SSB that is periodically transmitted by a base station. When the terminal is in an idle mode, the terminal may start blind SSB detection.

When LBT succeeds within a window duration that periodically returns, the base station may transmit a defer signal (or another DL signal) to the terminal until a next SSB burst length starts.

The base station may transmit an SSB including an occasion index to the terminal at a pre-determined location after the SSB burst length starts. The terminal may receive the SSB transmitted by the base station, may detect and measure synchronization signals (PSS and SSS) through the received SSB, and may receive an MIB, an SIB, and a DMRS.

The terminal may determine a synchronization signal transmission period, a synchronization signal offset, and a window duration through the received SSB.

The terminal may determine from which SSB burst length the received SSB is transmitted/received by using the occasion index in the received SSB. Also, the terminal may detect a frame boundary by using information included in the received SSB.

Figure 1I:
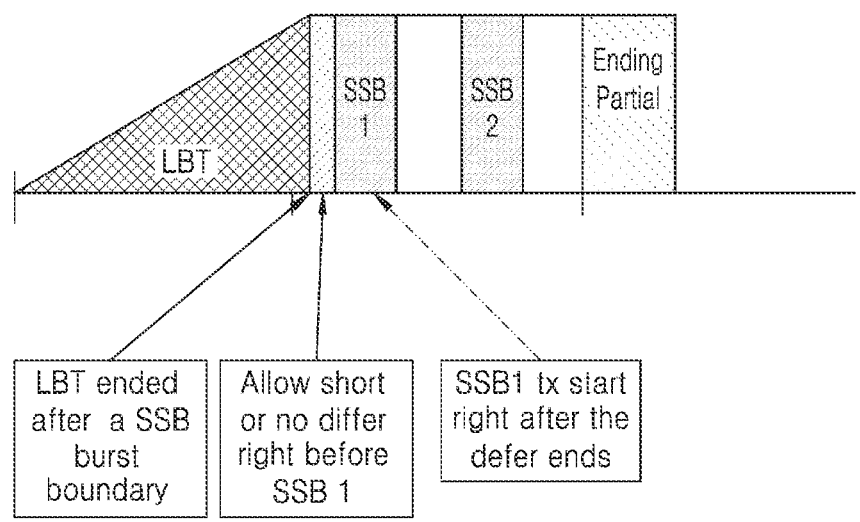
FIG. 1I illustrates a method by which a base station transmits an SSB, according to some embodiments of the present disclosure.

FIG. 1I illustrates a method by which a base station transmits an SSB, according to some embodiments of the present disclosure.

In FIG. 1I, when LBT of a base station does not end before one SSB burst length start point but ends before substantial SSB transmission starts, the base station may start SSB transmission at an expected location.

As shown in FIG. 1I, an LBT end point of time may not occur before an SSB burst length, and LBT has only to end before actual SSB transmission starts.

Figure 1J:
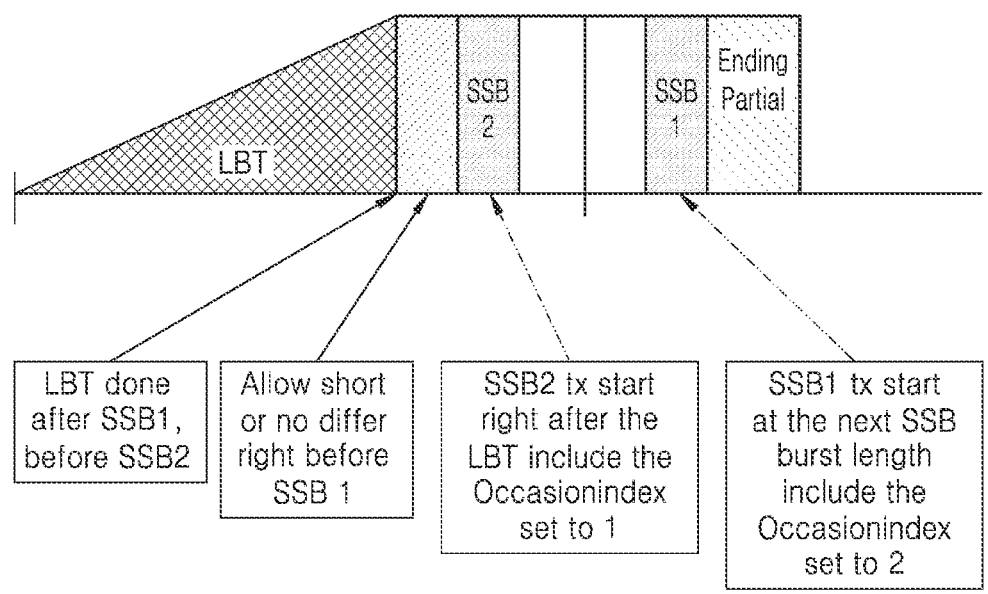
FIG. 1J illustrates a method by which a base station transmits an SSB, according to some embodiments of the present disclosure.

FIG. 1J illustrates a method by which a base station transmits an SSB, according to some embodiments of the present disclosure.

In FIG. 1J, when LBT of a base station does not end before a certain SSB (e.g., before an SSB1 start point of FIG. 1J) but ends before transmission of anther SSB (e.g., an SSB2 of FIG. 1J) starts, the base station may start transmission beginning from the SSB2.

As shown in FIG. 1J, an LBT end point of time may not have to occur before an SSB burst length, and when there remains a transmittable SSB at any point of time, transmission may start from the SSB. When all SSBs to be transmitted after a resource is occupied need to be transmitted (e.g., when the SSB1 and SSB2 need to be each transmitted once in FIG. 1J), the base station may need to defer for a certain period of time to transmit the SSB1. When the number of all SSBs to be sent by the base station is K and an SSB transmittable after LBT ends is an $L^{th}$ SSB, the base station may transmit $L^{th}$ to $K^{th}$ SSBs by using the same occasion index in the SSB curst length and may transmit first to $L-1^{th}$ SSBs by using an occasion index (e.g., increased by 1) different from the above occasion index in a next SSB burst length.

Embodiments of FIGS. 1E through 1GC, FIG. 1I, and FIG. 1J illustrate an example where a location of an OFDM symbol in which an SSB is transmitted in a radio frame is fixed (FIG. 1E), and examples where a location of an OFDM symbol in which an SSB is transmitted in a certain SSB burst length is fixed and the SSB burst length may be repeated within a certain SSB window duration. As a more flexible and free transmission method, there may be a method by which a location of an SSB is not fixed and transmission may start immediately after LBT ends.

Figure 1K:
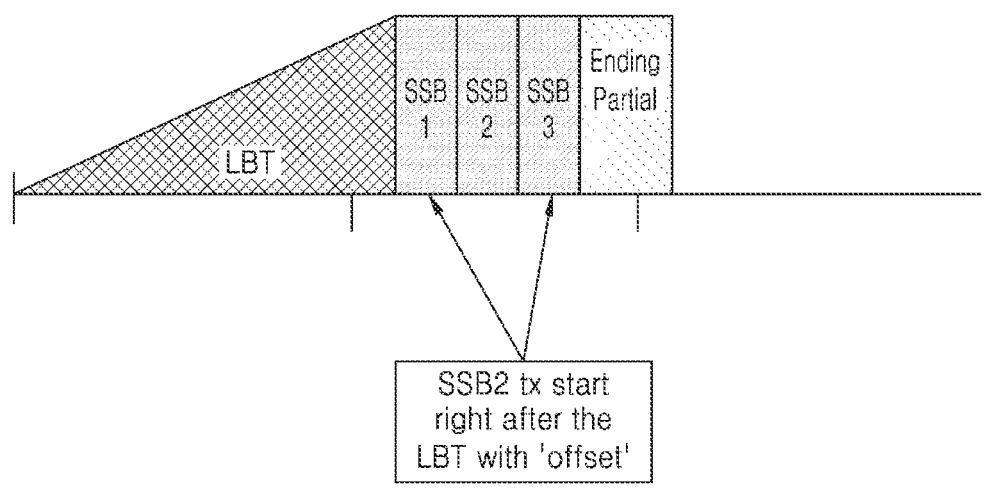
FIG. 1K illustrates a method of transmitting an SSB immediately after LBT ends, according to some embodiments of the present disclosure.

FIG. 1K illustrates a method of transmitting an SSB immediately after LBT ends, according to some embodiments of the present disclosure. Because there is no fixed SSB transmission location in the present disclosure, a base station may transmit an SSB immediately after LBT ends.

An SSB transmission method with no fixed SSB transmission location may be the most efficient and fastest SSB transmission method because there is no unnecessary waiting time and excess time. However, in such transmission, for slot and frame boundary synchronization, information to be additionally included in SSBs and transmitted may be required. The information to be additionally included in SSBs and transmitted may be as follows.

OFDM symbol number for specifying an SSB transmission location in a slot
  Slot number for specifying a slot in which an SSB is transmitted in a subframe When the base station additionally transmits only the two above information to the terminal, the terminal may specify a slot boundary by using the OFDM symbol number, and may specify a radio frame boundary by using the slot number.

A method of providing an OFDM symbol number for specifying an SSB transmission location in a slot according to some embodiments may be as follows.

Up to 14 OFDM symbols may be included in one slot. In order to accommodate all symbols, 4-bit additional information should be included in PSS/SSS/MIB/SIB/DMRS/PBCH payload in an SSB and transmitted.
  When 4 OFDM symbols of PSS/PBCH/SSS/PBCH constitute one SSB, only 11 OFDM symbols obtained by subtracting 3 OFDM symbols from 14 OFDM symbols may constitute a start location of the SSB. In this case, bits for indicating the 11 OFDM symbols may be required, and 4 bits may still be required. When a slot number of a slot in which an SSB is transmitted is M, 11 symbol numbers may be represented as 'Mx14+N', where N is an OFDM symbol number in the slot and ranges from 0 to 13. As a PSS location, a PBCH location, and an SSS location are specified, the 11 symbol numbers may have ranges of 'Mx14+0 to Mx14+11', 'Mx14+1 to Mx14+12', 'Mx14+2 to Mx14+13', or 'Mx14+3 to Mx14+14'. 4-bit additional information may be included in PSS/SSS/MIB/SIB/DMRS/PBCH payload of the SSB and may be transmitted.

In order to further reduce the number of transmitted bits, more rules need to be determined. When 11 symbols are further reduced by 3 to 8 symbols, 3 bits only need to be transmitted. A method of reducing 3 symbols may be as follows. However, the present disclosure is not limited thereto, and there may be various other methods.

SSB transmission should not start in symbols of a, b, and c locations in a slot. In this case, the symbols of {a,b,c} are information that is already known between the terminal and a network or is included in an SSB and transmitted, and any combination among $0^{th}$ to $13^{th}$ in the slot may be possible. Example: {0,6,13}, {0,7,13}, {0,1,13}, {0,12,13}, . . . .

SSB transmission may start only in an odd (or even)-numbered OFDM symbol. In this case, odd/even-numbered information may be included as a 1-bit indicator in PSS/SSS/MIB/SIB/DMRS/PBCH payload and may be transmitted.

3-bit additional information may be included in the PSS/SSS/MIB/SIB/DMRS/PBCH payload in the SSB and may be transmitted.

In order to reduce the number of transmitted bits, more rules need to be determined. When 11 symbols are reduced to 4 symbols, 2 bits only need to be transmitted. A method of reducing transmitted symbols may be as follows. However, the present disclosure is not limited thereto, and there may be various other methods.

SSB transmission should start in symbols of a, b, c, and d locations in a slot. In this case, the symbols of {a,b,c,d} are information that is already known between the terminal and the network or is included in an SSB and transmitted, and any combination among $0^{th}$ to $13^{th}$ in the slot may be possible. Example: {0,3,6,9}, {1,4,7,10}, {2,4,6,8}, {1,3,5,7}, . . . .

2-bit additional information may be included in PSS/SSS/MIB/SIB/DMRS/PBCH payload in the SSB and may be transmitted.

A method of providing a slot number for specifying an SSB transmission slot location in a half-frame according to some embodiments may be as follows.

According to subcarrier spacing, a slot number may range from 0 to 80. When a half-frame index (1 bit) that is already included in an SSB is considered, up to 40 slot numbers may need to be additionally notified to the terminal. To this end, up to 6-bit additional information may be included in PSS/SSS/MIB/SIB/DMRS/PBCH payload in the SSB and may be transmitted.

A flexible SSB transmission method according to FIG. 1K is a method for reducing an unnecessary waiting time and overhead due to transmission of an SSB of a fixed location, and a 1-bit indicator indicating that the network uses or does not use the flexible SSB transmission method may be in PSS/SSS/MIB/SIB/DMRS/PBCH payload in the SSB and may be transmitted to the terminal.

Figure 2A:
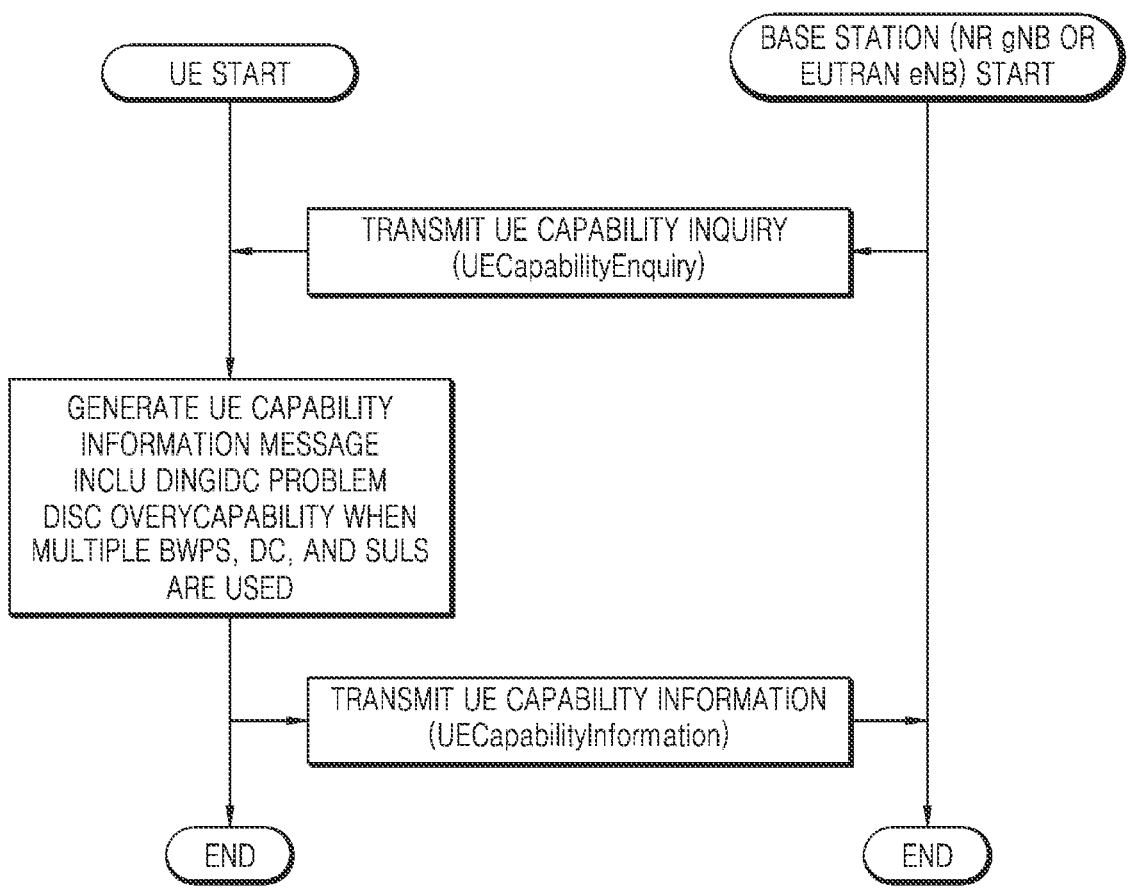
FIG. 2A illustrates a procedure by which a user equipment (UE) transmits capability information to a network, according to some embodiments of the present disclosure.

FIG. 2A illustrates a procedure by which a terminal transmits capability information to a network, according to some embodiments of the present disclosure.

A network (e.g., an NR base station or an evolved universal terrestrial radio access network (EUTRAN) base station) may transmit a UECapabilityEnquiry signal for requesting a UE in an RRC_CONNECTED state to transmit UE capability information. The UE receiving the UECapabilityEnquiry signal may generate a UECapabilityInformation signal including various UE capability information and may transmit the UECapabilityInformation signal to the network. When the UECapabilityInformation signal is generated, the UE may generate the UECapabilityInformation signal including a message indicating whether multiple BWPs are supported, whether various DC structures such as LTE-NR DC, NR-LTE DC, or NR-NR DC are supported, whether an SUL is supported, and that the UE is capable of finding an IDC problem when multiple BWPs, DC, and SULs are used. The UE may generate the UECapabilityInformation signal including the following messages indicating that the UE is capable of reporting a DC-related problem to the network and may transmit the generated UECapabilityInformation signal to the base station.

The UECapabilityInformation signal may include various capability information supported by the UE. The UE capable of finding an IDC problem that may occur in a DC structure may generate the UECapabilityInformation signal including a message in which inDeviceCoexInd-UL-DC is configured as 'supported'.

| Other-Parameters::= | SEQUENCE { | |
|---|---|---|
| inDeviceCoexInd-UL-DC | ENUMERATED {supported} | OPTIONAL |
| } | | | inDeviceCoexInd-UL-DC may be configured only when the UE supports IDC, for example, when the UE includes inDeviceCoexInd in the UECapabilityInformation signal.

| InDeviceCoexInd-UL-DC |
|---|
| is an indicator indicating whether the UE supports uplink (UL) dual connectivity (DC)-related in-device coexistence (IDC) information signal transmission. The field may be supported and included only when inDeviceCoexInd that is an indicator indicating whether the UE supports IDC information signal transmission is included (supported). The UE supports inDeviceCoexind-UL-DC in the same duplexing modes as inDeviceCoexInd. |

The UECapabilityInformation signal may include various capability information supported by the UE. The UE may receive and use one or more BWPs, and may find an IDC problem that may not be solved by the UE itself from among the multiple BWPs. The UE capable of finding such an IDC problem may report the BWP-related IDC problem to the network. The UE may notify the network that the UE is capable of reporting the BWP-related IDC problem by transmitting the UECapabilityInformation signal including the following message.

```
Other-Parameters::=      SEQUENCE {
    inDeviceCoexInd-UL-BWP      ENUMERATED {sup-
ported}         OPTIONAL
}
``` inDeviceCoexInd-UL-BWP may be configured only when the UE supports IDC, for example, when terminal includes inDeviceCoexInd in the UECapabilityInformation signal.

| InDeviceCoexInd-UL-BWP |
|---|
| is an indicator indicating whether the UE supports uplink (UL) multi-BWP-related in-device coexistence (IDC) information signal transmission. The field may be supported and included only when inDeviceCoexInd that is an indicator indicating whether the UE supports IDC information signal transmission is included (supported). The UE supports inDeviceCoexInd-UL-BWP in the same duplexing modes as inDeviceCoexInd. |

The UECapabilityInformation signal may include various capability information supported by the UE. The UE may receive and may use one or more SULs, and may find an IDC problem that may not be solved by the UE itself from among the multiple SULs. The UE capable of finding such an IDC problem may report the SUL-related IDC problem to the network. The UE may notify the network that the UE is capable of reporting the SUL-related IDC problem by transmitting the UECapabilityInformation signal including the following message.

```
Other-Parameters: :=     SEQUENCE {
    inDeviceCoexInd-UL-SUL      ENUMERATED {supported}      OPTIONAL
}
``` inDeviceCoexInd-UL-SUL may be configured only when the UE supports IDC, for example, when the terminal includes inDeviceCoexInd in the UECapabilityInformation signal.

| InDeviceCoexInd-UL-SUL |
|---|
| is an indicator indicating whether the UE supports supplementary uplink (SUL)-related in-device coexistence (IDC) information signal transmission. The field may be supported and included only when inDeviceCoexInd that is an indicator indicating whether the UE supports IDC information signal transmission is included (supported). The UE supports inDeviceCoexInd-UL-SUL in the same duplexing modes as inDeviceCoexInd . |

The four message structures including IDC problem observation and report capability of the UE may be as follows.

```
Other-Parameters: :=     SEQUENCE {
    inDeviceCoexInd- UL-CA      ENUMERATED {supported}     OPTIONAL
    inDeviceCoexInd-UL-DC       ENUMERATED {supported}     OPTIONAL
    inDeviceCoexInd- UL-BWP     ENUMERATED {supported}     OPTIONAL
    inDeviceCoexInd-UL-SUL      ENUMERATED {supported}     OPTIONAL
}
```

Figure 2B:
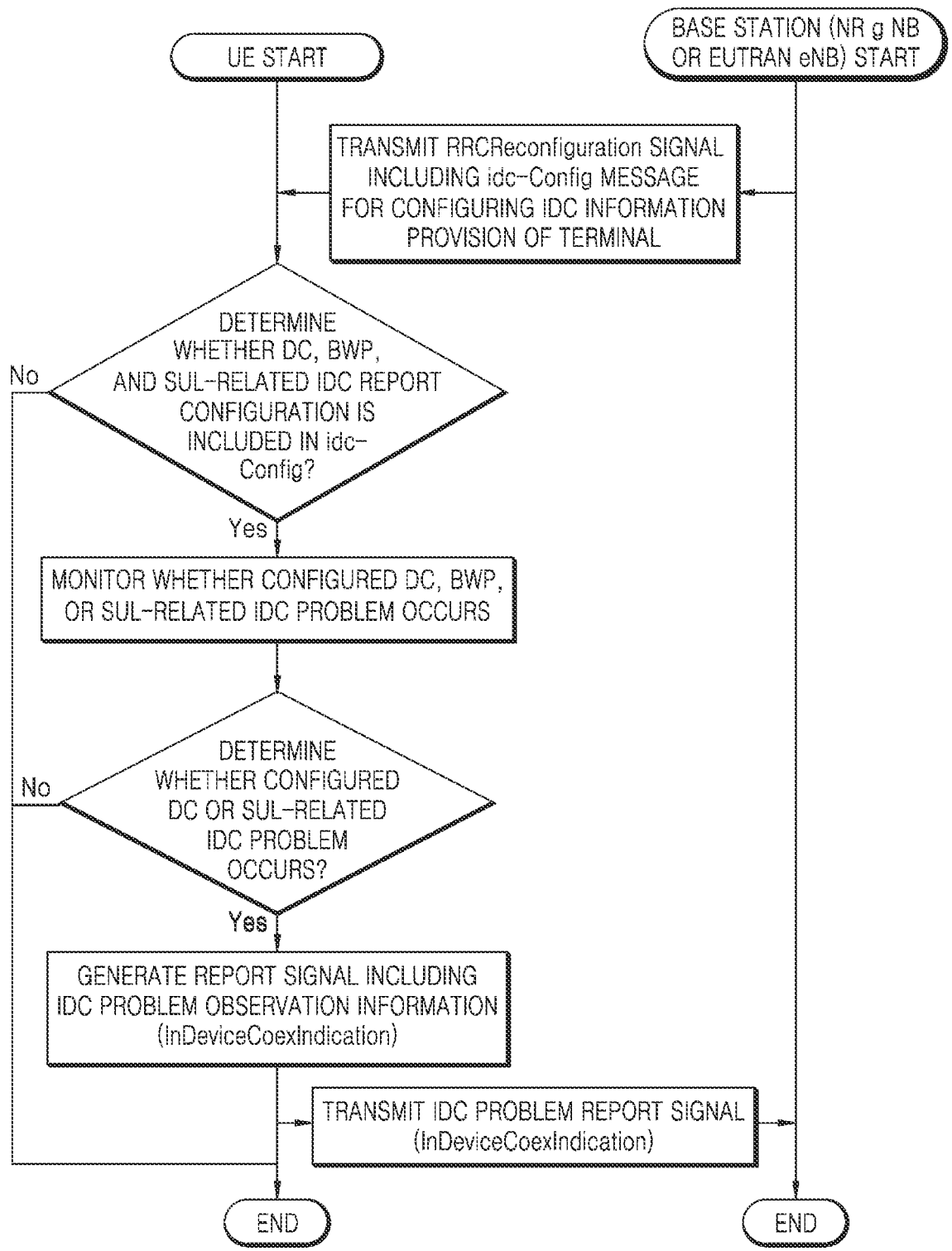
FIG. 2B illustrates a procedure by which a UE transmits capability information to a network, according to some embodiments of the present disclosure.

FIG. 2B illustrates a procedure by which a UE transmits capability information to a network, according to some embodiments of the present disclosure.

Referring to FIG. 2B, a UE supporting IDC information provision may notify UE capability to a network by providing UECapabilityInformation to the network, and the network being aware of the UE capability may configure IDC information provision in the UE through an RRC signal. The UE in which the IDC information provision is configured may monitor whether a configured IDC problem occurs, and when an IDC problem occurs, may generate a report signal including related information and may transmit the report signal to the network. A UE operation related thereto may be as follows.

The UE may operate as follows.

1> determine whether idc-Config is included in a received RRCConfig signal:

2> when idc-Config is included in the RRCConfig signal (i.e., configured as setup):

3> the UE may recognize (regard) that the UE is configured to transmit an IDC indication, and may perform an IDC indication-related procedure;

3> when idc-Indication-UL-CA is included in idc-Config (i.e., configured as setup):

4> the UE may recognize (regard) that the UE is configured to include UL CA-related information in the IDC indication and transmit the same, and may perform an IDC indication-related procedure;

3> when idc-Indication-UL-DC is included in idc-Config (i.e., configured as setup):

4> the UE may recognize (regard) that the UE is configured to include UL DC-related information in the IDC indication and transmit the same, and may perform an IDC indication-related procedure;

3> when idc-Indication-UL-BWP is included in idc-Config (i.e., configured as setup):

4> the UE may recognize (regard) that the UE is configured to include UL BWP-related information in the IDC indication and transmit the same, and may perform an IDC indication-related procedure;

3> when idc-Indication-UL-SUL is included in idc-Config (i.e., configured as setup):

4> the UE may recognize (regard) that the UE is configured to include UL SUL-related information in the IDC indication and transmit the same, and may perform an IDC indication-related procedure;

2> otherwise (i.e., when idc-Config is not included in the RRCConfig signal):

3> the UE regards that the UE is configured not to transmit the IDC indication;

The UE may receive an RRCConfig message (e.g., otherConfig) including idc-Config, and may determine whether idc-Indication is configured in the received RRCConfig message. When idc-Indication is configured (e.g., configured as Setup), the UE may recognize that the UE is configured to provide IDC information to the network. When idc-Indication-UL-CA is configured in the RRCConfig message, the UE may recognize that the UE is configured to provide carrier aggregation-related IDC information to the network. Also, when idc-Indication-UL-DC is configured in the RRCConfig message, the UE may recognize that the UE is configured to provide dual connectivity-related IDC information to the network. Also, when idc-Indication-UL-BWP is configured in the RRCConfig message, the UE may recognize that the UE is configured to provide bandwidth part-related IDC information to the network. Also, when idc-Indication-UL-SUL is configured in the RRCConfig message, the UE may recognize that the UE is configured to provide supplementary uplink-related IDC information to the network. Also, when HardwareSharingIndicationEutra is configured in the RRCConfig message, the UE may recognize that the UE is configured to provide information on occurrence of a hardware problem that may not be solved by the UE itself in an E-UTRA system to the network. Also, when HardwareSharingIndicationNR is configured in the RRCConfig message, the UE may recognize that the UE is configured to provide information on occurrence of a hardware problem that may not be solved by the UE itself in an NR system to the network. idc-Config configuration information may have the following structure.

1> when the UE is configured to provide IDC indications:
2> when the UE has never transmitted an InDeviceCoexIndication signal after being configured to provide the IDC indications:
3> when one or more frequencies are configured as measObjectEUTRA and the UE undergoes an IDC problem that may not be solved by the UE itself; or
3> when one or more frequencies are configured as measObjectNR, and the UE undergoes an IDC problem that may not be solved by the UE itself; or
3> when the UE is configured to provide uplink carrier aggregation (UL CA)-related IDC indications, and the UE undergoes an IDC problem that may not be solved by the UE itself, for UL CA combinations related to carrier frequencies for which one or more measurement objects are configured:
4> the UE starts transmitting an InDeviceCoexIndication message;
3> when the UE is configured to provide UL DC-related IDC indications, and the UE undergoes an IDC problem that may not be solved by the UE itself, for UL DC combinations related to carrier frequencies for which one or more measurement objects are configured:
4> the UE starts transmitting the InDeviceCoexIndication message;
3> when the UE is configured to provide UL BWP-related IDC indications, and the UE undergoes an IDC problem that may not be solved by the UE itself, for UL BWP combinations related to carrier frequencies for which one or more measurement objects are configured:
4> the UE starts transmitting the InDeviceCoexIndication message;

```
IDC-Config : : =              SEQUENCE {
    idc-Indication            ENUMERATED{setup}     OPTIONAL,
-- Need OR
        autonomousDenialParamaters    SEQUENCE {
            autonomousDenialSubframes      ENUMERATED {n2, . . . , n30, spares2, spare1},
            autonomousDenialValidity       ENUMERATED {sf200, . . . , f2000, spare4, . . . , spare1}
        }                                            OPTIONAL,      --
    . . . ,
    idc-Indication-UL-CA      ENUMERATED{setup}     OPTIONAL
-- Cond idc-Ind,
    idc-Indication-UL-DC      ENUMERATED{setup}     OPTIONAL
-- Cond idc-Ind,
    idc-Indication-UL-BWP     ENUMERATED{setup}     OPTIONAL
-- Cond idc-Ind,
    idc-Indication-UL-SUL     ENUMERATED{setup}     OPTIONAL
-- Cond idc-Ind,
    idc-HardwareSharingIndicationEutra     ERUMERATED{setup}    OPTIONAL
        -- Need OR
    idc-HardwareSharingIndicationNR        ENUMERATED{setup}    OPTIONAL
        -- Need OR
```

The UE may monitor IDC for each resource and connection in real time according to configured information. Also, when a certain IDC problem that may not be solved by the UE itself is observed for a corresponding resource and connection or other IDC problem information transmission conditions are satisfied, the UE may trigger and start an operation of transmitting information on the IDC problem to the network as follows.

The UE capable of providing an IDC indication and configured to provide the IDC indication may start the following procedures according to a change of IDC problem information.

As the procedures start, the UE may perform the following operation.

3> when the UE is configured to provide UL SUL-related IDC indications, and the UE undergoes an IDC problem that may not be solved by the UE itself, for UL SUL combinations related to carrier frequencies for which one or more measurement objects are configured:
4> the UE starts transmitting the InDeviceCoexIndication message;
2> otherwise (i.e., when the UE has ever transmitted the InDeviceCoexIndication signal after being configured to provide the IDC indications):
3> when one or more frequencies are configured as measObjectEUTRA, and a set of frequencies on which the UE undergoes an IDC problem that may not be solved by the UE itself is different from a set indicated by the InDeviceCoexIndication message that is most recently transmitted; or 3> when one or more frequencies are configured as measObjectNR, and a set of frequencies on which the UE undergoes an IDC problem that may not be solved by the UE itself is different from a set indicated by the InDeviceCoexIndication message that is most recently transmitted; or 3> when, for one or more frequencies in a set of frequencies that are previously reported, an interferenceDirection value is different from an interferenceDirection value included in the InDeviceCoexIndication message that is most recently transmitted by the UE; or 3> when, for one or more frequencies in a set of frequencies that are previously reported, an AffectedDIBWPList value is different from an AffectedDIBWPList value included in the InDeviceCoexIndication message that is most recently transmitted by the UE; or 3> when, for one or more frequencies in a set of frequencies that are previously reported, an AffectedUIBWPList value is different from an AffectedUIBWPList value included in the InDeviceCoexIndication message that is most recently transmitted by the UE; or 3> when, for one or more frequencies in a set of frequencies that are previously reported, an SUL-Id value is different from an SUL-Id value included in the InDeviceCoexIndication message that is most recently transmitted by the UE; or 3> when the TDM assistance information is different form the TDM assistance information included in the InDeviceCoexIndication message that is most recently transmitted by the UE; or 3> when the UE is configured to provide UL CA-related IDC indications, and victimSystemType is different from a victimSystemType value included in the InDeviceCoexIndication message that is most recently transmitted by the UE; or 3> when the UE is configured to provide UL CA-related IDC indications, and affectedCarrerFreqCombList is different from an affectedCarrierFreqCombList value included in the InDeviceCoexIndication message that is most recently transmitted by the UE; or 3> when the UE is configured to provide UL CA-related IDC indications, and AffectedUIBWPList is different from an AffectedUIBWPList value included in the InDeviceCoexIndication message that is most recently transmitted; or 3> when the UE is configured to provide UL CA-related IDC indications, and SUL-Id is different from an SUL-Id value included in the InDeviceCoexIndication message that is most recently transmitted by the UE; or 3> when the UE is configured to provide UL DC-related IDC indications, and victimSystemType is different from a victimSystemType value included in the InDeviceCoexIndication message that is most recently transmitted by the UE; or 3> when the UE is configured to provide UL DC-related IDC indications, and affectedCarrierFreqCombList is different from an affectedCarrierFreqCombList value included in the InDeviceCoexIndication message that is most recently transmitted by the UE; or 3> when the UE is configured to provide UL DC-related IDC indications, and AffectedUIBWPList is different from an AffectedUIBWPList value included in the InDeviceCoexIndication message that is most recently transmitted by the UE; or 3> when the UE is configured to provide UL DC-related IDC indications, and SUL-Id is different from an SUL-Id value included in the InDeviceCoexIndication message that is most recently transmitted by the UE; or 3> when the UE is configured to provide UL BWP-related IDC indications, and victimSystemType is different from a victimSystemTyp value included in the InDeviceCoexIndication message that is most recently transmitted by the UE; or 3> when the UE is configured to provide UL BWP-related IDC indications, and affectedCarrierFreqCombList is different from an affectedCarrierFreqCombList value included in the InDeviceCoexIndication message that is most recently transmitted by the UE; or 3> when the UE is configured to provide UL BWP-related IDC indications, and AffectedUIBWPList is different from an AffectedUIBWPList value included in the InDeviceCoexIndication message that is most recently transmitted by the UE; or 3> when the UE is configured to provide UL BWP-related IDC indications, and SUL-Id is different from an SUL-Id value included in the InDeviceCoexIndication message that is most recently transmitted by the UE; or 3> when the UE is configured to provide UL SUL-related IDC indications, and victimSystemType is different from a victimSystemType value included in the InDeviceCoexIndication message that is most recently transmitted by the UE; or 3> when the UE is configured to provide UL SUL-related IDC indications, and affectedCarrierFreqCombList is different from an affectedCarrierFreqCombList value included in the InDeviceCoexIndication message that is most recently transmitted by the UE; or 3> when the UE is configured to provide UL SUL-related IDC indications, and AffectedUIBWPList is different from an AffectedUIBWPList value included in the InDeviceCoexIndication message that is most recently transmitted by the UE; or 3> when the UE is configured to provide UL SUL-related IDC indications, and SUL-Id is different form an SUL-Id value included in the InDeviceCoexIndication message that is most recently transmitted by the UE:

4> the UE starts transmitting the InDeviceCoexIndication message;

NOTE 1: The term "IDC problems" refers to interference issues applicable across several subframes/slots where not necessarily all the subframes/slots are affected.

NOTE 2: For the frequencies on which a serving cell or serving cells is configured that is activated, IDC problems consist of interference issues that the UE cannot solve by itself, during either active data exchange or upcoming data activity which is expected in up to a few hundred milliseconds.

For frequencies on which a SCell or SCells is configured that is deactivated, reporting IDC problems indicates an anticipation that the activation of the SCell or SCells would result in interference issues that the UE would not be able to solve by itself.

For a non-serving frequency, reporting IDC problems indicates an anticipation that if the non-serving frequency or frequencies became a serving frequency or serving frequencies then this would result in interference issues that the UE would not be able to solve by itself.

Various information may be included in an IDC information signal (InDeviceCoexIndication) that is generated by the UE and is reported to the network, considered in an IDC transmission signal generation procedure of the UE.

```
InDeviceCoexIndication ::=     SEQUENCE {
    affectedCarrierFreqListEutra    AffectedCarrierFreqListEntra    OPTIONAL,
    affectedCarrierFreqListNR       AffectedCarrierFreqListNR       OPTIONAL,
    tdm-AssistanceInfo              TDM-AssistanceInfo              OPTIONAL,
    ul-CA-AssistanceInfo            SEQUENCE {
        affectedCarrierFreqCombList        AffectedCarrierFreqComblist               OPT
IONAL,
        victimSystemType                   VictimSystemType
    }
    ul-DC-AssistanceInfo            SEQUENCE {
        affectedCarrierFreqCombList        AffectedCarrierFreqComblist               OPT
IONAL,
        victimSystemType                   VictimSystemType
    }
    ul-BWP-AssistanceInfo           SEQUENCE {
        affectedCarrierFreqCombList        AffectedCarrierFreqCombList               OPT
IONAL,
        victimSystemType                   VictimSystemType
    }
    ul-SUL-AssistanceInfo           SEQUENCE {
        affectedCairierFreqComblist        AffectedCarrierFreqCombList               OPT
IONAL,
        victimSystemType                   VictimSystemType
    }
    affectedCarrierFreqComblist        AffectedCarrierFreqComblist               OPTIONAL,
    hardwareSharingProblemEutra        ENUMERATED {true}                         OPTIONAL,
    hardwareSharingProblemNR           ENUMERATED {true}                         OPTIONAL,
}
AffectedCarrierFreqListEutra : : =    SEQUENCE (SIZE (1. .maxFreqIDCEutra) ) OF
AffectedCarrierPreqEutra
AffectedCarrierFreqListNR   : : =    SEQUENCE (SIZE (1. .maxFreqIDCNR) ) OF
AffectedCarrierFreqNR
AffectedCarrierFreqEutra : :=        SEQUENCE {
    carrierFreq                         CHOICE {
        servingCellFreq                     ENUMERATED {MeasObjectId, ARFCN-Value},
        nonServingCellFreq                  ENUMERATED {MeasObjectId, ARFCN-Value},
    },
    interferenceDirection           ENUMERATED {NR, eutra, other, both, spare, SUL}
    AffectedDlBWPList               SEQUENCE (SIZE(1. .maxNrofIDCAffectedDLBWPs) ) OF
BWP-Id       optional -- Cond interferenceDirectionIsNR
    AffectedDlBWPList               SEQUENCE (SIZE(1. .maxNrofIDCAffectedULBWPS) ) OF
BWP-Id       optional -- Cond interferenceDirectionIsNR
}
AffectedCarrierFreqNR : : =    SEQUENCE {
    carrierFreq                         CHOICE {
        servingCellFreq                     ENUMERATED {MeasObjectId, ARFCN-Value},
        nonServingCellFreq                  ENUMERATED {MeasObjectId, ARFCN-Value},
    },
    interferenceDirection           ENUMERATED {NR, eutra, other, both, spare, SUL}
    AffectedDlBWPList               SEQUENCE (SIZE(1. .maxNrofIDCAffectedDLBWPs)) OF
BWP-Id       optional
    AffectedUlBWPList               SEQUENCE (SIZE(1. .maxNrofIDCAffectedULBWPs) ) OF
BWP-Id       optional
}
```

E-UTRA carrier frequency information affected by IDC may be included in IDC information included in the IDC information signal (InDeviceCoexIndication).

```
AffectedCarrierFreqListEutra : : =      SEQUENCE (SIZE (1. .maxFreqIDCEutra) ) OF
AffectedCarrierFreqEutra
AffectedCarrierFreqEutra : : =          SEQUENCE {
    carrierFreq                             CHOICE {
        servingCellFreq                         ENUMERATED {MeasObjectId,
ARFCN-Value},
        nonServingCellFreq                      ENUMERATED {MeasObjectId,
ARFCN-Value},
    },
    interferenceDirection                   ENUMERATED {NR, eutra, other, both, spare
SUL}
    AffectedDlBWPList                       SEQUENCE
(SIZE(1. .maxNrofIDCAffectedDLBWPs) )   OF BWP-Id          optional -- Cond
interferenceDirectionIsNR
    AffectedUlBWPList                       SEQUENCE
(SIZE (1. .maxNrofIDCAffectedULBWPs) )   OF BWP-Id          optional -- Cond
interferenceDirectionIsNR
}
``` maxFreqIDCEutra is a maximum number of carrier frequencies that may be affected by IDC in E-UTRA. maxFreqIDCEutra may be the same value as maxFreqIDCNR, and in this case, maxFreqIDCNR and maxFreqIDCEutra may be replaced with one constant (maxFreqIDC).

carrier frequency may enable the UE to specify a frequency through a measurement object Id or absolute radio frequency channel number (ARFCN) value for an NR serving cell and a non-serving cell.

interferenceDirection may enable the UE to indicate a victim radio system affected by interference due to IDC.

AffectedDIBWPList may enable the UE to indicate victim downlink BWPs affected by interference due to IDC.

AffectedDIBWPList may enable the UE to indicate victim uplink BWPs affected by interference due to IDC.

Lists such as AffectedDIBWPList and AffectedUIBWPList may be provided in the following form such as AffectedDIBWP and AffectedUIBWP, to configure only one value.

| | | |
|---|---|---|
| AffectedDIBWP<br>interferenceDirectionIsNR | BWP-Id | optional -- Cond |
| AffectedUIBWP<br>interferenceDirectionIsNR | BWP-Id | optional -- Cond |

A configuration condition such as interferenceDirectionIsNR may exist in AffectedDIBWPList, AffectedUIBWPList, AffectedDIBWP, and AffectedUIBWP that are BWP-related fields. This is because there is no BWP configuration in EUTRA, and thus the BWP-related fields may be configured only when NR is included in a system affected only by IDC interference.

Also, NR carrier frequency information that is affected by IDC may be included in IDC information included in the IDC information signal (InDeviceCoexIndication).

```
AffectedCarrierFreqListNR        ::=    SEQUENCE (SIZE (1..maxFreqIDCNR) ) OF
AffectedCarrierFreqNR
AffectedCarrierFreqNR : :=              SEQUENCE {
        carrierFreq                             CHOICE {
              servingCellFreq                         ENUMERATED {MeasObjectId,
ARFCN-Value},
              nonServingcellFreq                      ENUMERATED {MeasObjectId,
ARFCN-Value},
        },
        interferenceDirection                   ENUMERATED {NR, eutra, other, both, spare,
SUL}
        AffectedDIBWPList                       SEQUENCE
(SIZE(1..maxNrofIDCAffectedDLBWPS) ) OF BWP-Id               optional
        AffectedUIBWPList                       SEQUENCE
(SIZE(1..maxNrofCAffectedULBWPS) )  OF BWP-Id                optional
``` maxFreqIDCNR may be a maximum number of carrier frequencies that may be affected by IDC in NR. maxFreqIDCNR may be the same value as maxFreqIDCEutra, and in this case, maxFreqIDCNR and maxFreqIDCEutra may be replaced with one constant (maxFreqIDC).

carrier frequency may enable the UE to specify a frequency through a measurement object Id or ARFCN value for an NR serving cell and a non-serving cell.

interferenceDirection may enable the UE to indicate a victim radio system affected by interference due to IDC.

AffectedDIBWPList may enable the UE to indicate victim downlink BWPs affected by interference due to IDC.

AffectedDIBWPList may enable the UE to indicate victim uplink BWPs affected by interference due to IDC.

Lists such as AffectedDIBWPList and AffectedUIBWPList may be provided in the following form such as AffectedDIBWP and AffectedUIBWP, to configure only one value.

| | | |
|---|---|---|
| AffectedDIBWP | BWP-Id | optional |
| AffectodUIBWP | BWP-Id | optional |

Assistance information affected by UL CA-related IDC may be included in an IDC information signal (InDeviceCoexIndication) that is generated by the UE and is reported to the network, considered in an IDC transmission signal generation procedure of the UE.

```
ul-CA-AssistanceInfo          SEQUENCE {
    affectedCarrierFreqCombList    AffectedCarrierFreqCombList
OPTIONAL,
    victimSystemType               VictimSystemType
}
```

Carrier frequency combination information affected by IDC discovered in corresponding UL CA may be included as a field named affectedCarrierFreqCombList in the UL CA-related assistance information, and may include up to maxCombIDC affected frequency combinations (AffectedCarrierFreqComb).

Also, AffectedCarrierFreqComb may include two or more, up to maxServCell or less uplink (UL) frequency information (AffectedCarrierFreqUL). The UL frequency information (AffectedCarrierFreqUL) may include carrier frequency, SUL indicator, and AffectedUIBWPList.

Carrier frequency combination information affected by IDC discovered in corresponding UL DC may be included as a field named affectedCarrierFreqCombList in the UL DC-related assistance information, and may include up to maxCombIDC affected frequency combinations (AffectedCarrierFreqComb).

Also, AffectedCarrierFreqComb may include two or more, up to maxServCell uplink (UL) frequency information (AffectedCarrierFreqUL). The UL frequency information (AffectedCarrierFreqUL) may include carrier frequency, SUL indicator, and AffectedUIBWPList.

```
AffectedCarrierFreqCombList : : = SEQUENCE (SIZE (1. .maxCombIDC) ) OF
AffectedCarrierFreqComb
AffectedCarrierFreqComb : : = SEQUENCE (SIZE (2. .maxServCell) ) OF
AffectedCarrierFreqUL
AffectedCarrierFreqUL : : =   SEQUENCE {
        carrierFreq             CHOICE {
            servingCellFreq        ENUMERATED {MeasObjectId,
ARFCN-Value},
            nonservingCellFreq     ENUMERATED {MeasObjectId, ARFCN-Value},
        },
        SUL indicator          Enumerated{FFS}              OPTIONAL,  --Cond UL
CA
        AffectedUIBWPList      SEQUENCE (SIZE (1. .maxNrofIDCAffectingULBWPs) )
OF BWP-Id OPTIONAL,
}
``` victimSystemType affected by IDC discovered in the UL CA is included in the UL CA-related assistance information, and is as follows.

```
VictimSystemType : : = SEQUENCE {
    NR              ENUMERATED{true} OPTIONAL,
    eutra           ENUMERATED{true} OPTIONAL,
    gps             ENUMERATED{true} OPTIONAL,
    glonass         ENUMERATED{true} OPTIONAL,
    bds             ENUMERATED{true} OPTIONAL,
    galllieo        ENUMERATED{true} OPTIONAL,
    wlan            ENUMERATED{true} OPTIONAL,
    bluetooth       ENUMERATED{true} OPTIONAL,
}
```

Assistance information affected by UL DC-related IDC may be included in an IDC information signal (InDeviceCoexIndication) that is generated by the UE and is reported to the network, considered in an IDC transmission signal generation procedure of the UE.

```
ul-DC-AssistanceInfo          SEQUENCE {
    affectedCarrierFreqComblist    AffectedCarrierFreqCombList
OPTIONAL,
    victimSystemType               VictimSystemType
}
```

```
AffectedCarrierFreqCombList : : = SEQUENCE (SIZE (1. .maxCombIDC) ) OF
AffectedCarrierFreqComb
AffectedCarrierFreqComb : : = SEQUENCE (SIZE (2. .maxServCell) ) OF
AffectedCarrierFreqUL
AffectedCarrierFreqUL : : =   SEQUENCE {
        carrierFreq              CHOICE {
              servingCellFreq            ENUMERATED {MeasObjectId,
ARFCN-Value},
              nonservingCellFreq         ENUMERATED {MeasObjectId, ARFCN-Value},
        },
        SUL indicator            Enumerated{FFS}              OPTIONAL,   --Cond UL
DC
        AffectedUlBWPList        SEQUENCE (SIZE (1. .maxNrofIDCAffectingULBWPs) )
OF BWP-Id OPTIONAL,
}
```

Assistance information affected by UL BWP-related IDC may be included in an IDC information signal (InDevice-CoexIndication) that is generated by the UE and is reported to the network, considered in an IDC transmission signal generation procedure of the UE.

```
ul-BWP-AssistanceInfo            SEQUENCE {
        affectedCarrierFreqComblist        AffectedCarrierFreqCombList
    OPTIONAL,
        victimSystemType                   VictimSystemType
}
```

Carrier frequency combination information affected by IDC discovered in corresponding UL BWPs may be included as a field named affectedCarrierFreqCombList in the UL BWP-related assistance information, and may include maxCombIDC affected frequency combinations (AffectedCarrierFreqComb).

Also, AffectedCarrierFreqComb may include two or more, up to maxServCell or less uplink (UL) frequency information (AffectedCarrierFreqUL). The UL frequency information (AffectedCarrierFreqUL) may include carrier frequency, SUL indicator, and AffectedUlBWPList.

```
AffectedCarrierFreqCombList : : = SEQUENCE (SIZE (1. .maxCombIDC) ) OF
AffectedCarrierFreqComb
AffectedCarrierFreqComb : : = SEQUENCE (SIZE (2. .maxServCell) ) OF
AffectedCarrierFreqUL
AffectedCarrierFreqUL : : =   SEQUENCE {
        carrierFreq              CHOICE {
              servingCellFreq            ENUMERATED {MeasObjectId,
ARFCN-Value},
              nonservingCellFreq         ENUMERATED {MeasObjectId, ARFCN-Value},
        },
        SUL indicator            Enumerated{FFS}              OPTIONAL,   --Cond UL
BWP
        AffectedUlBWPList        SEQUENCE (SIZE (1. .maxNrofIDCAffectingULBWPs) )
OF BWP-Id OPTIONAL,
}
```

Assistance information affected by UL SUL-related IDC may be included in an IDC information signal (InDevice-CoexIndication) that is generated by the UE and is reported to the network, considered in an IDC transmission signal generation procedure of the UE.

```
ul-SUL-AssistanceInfo            SEQUENCE {
        affectedCarrierFreqComblist        AffectedCarrierFreqCombList
    OPTIONAL,
        victimSystemType                   VictimSystemType
}
```

Carrier frequency combination information affected by IDC discovered in corresponding UL SULs may be included as a field named affectedCarrierFreqCombList in the UL SUL-related assistance information, and may include up to maxCombIDC affected frequency combinations (Affected-CarrierFreqComb).

Also, AffectedCarrierFreqComb may include two or more, up to maxServCell or less uplink (UL) frequency information (AffectedCarrierFreqUL). The UL frequency information (AffectedCarrierFreqUL) may include carrier frequency, SUL indicator, and AffectedUIBWPList.

```
AffectedCarrierFreqCombList : : = SEQUENCE (SIZE (1. .maxCombIDC) ) OF
AffectedCarrierFreqComb
AffectedCarrierFreqComb : : = SEQUENCE (SIZE (2. .maxServCell) ) OF
AffectedCarrierFreqUL
AffectedCarrierFreqUL : : =   SEQUENCE {
        carrierFreq              CHOICE {
            servingCellFreq               ENUMERATED {MeasObjectId,
ARFCN-Value},
            nonservingCellFreq            ENUMERATED {MeasObjectId, ARFCN-Value},
        },
        SUL indicator            Enumerated{FFS}            OPTIONAL,  --Cond UL
BWP
        AffectedUIBWPList        SEQUENCE (SIZE (1. .maxNrofIDCAffectingULBWPs) )
OF BWP-Id OPTIONAL,
}
```

The UE may generate an IDC information signal (InDeviceCoexIndication) through the following procedure and may transmit the IDC information signal to the network.

The UE may generate the InDeviceCoexIndication signal as follows.

Figure 2C:
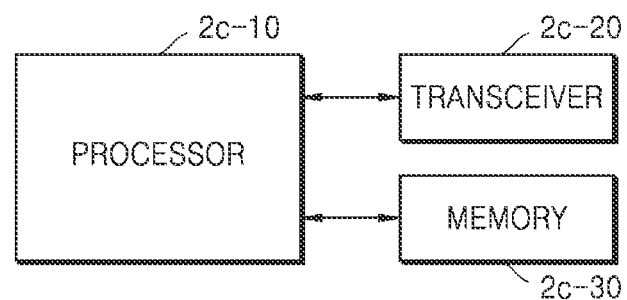
FIG. 2C is a block diagram illustrating a structure of a terminal according to some embodiments.

1> when the UE undergoes an IDC problem on an E-UTRA carrier frequency for which one or more measurement objects are configured:

2> include an affectedCarrierFreqListEutra field, for an E-UTRA carrier frequency for which measurement objects respectively affected by IDC problems are configured;

2> include and configure an interferenceDirection field, for an E-UTRA carrier frequency included in each affectedCarrierFreqListEutra, an interferenceDirection field is included and configured;

1> when the UE is configured to provide UL CA information and there exists a UL CA combination in which one or more measurement objects affected by IDC problems are configured:

2> include victimSystemType in ul-CA-AssistanceInfo;

2> when the UE configures victimSystemType as wlan or Bluetooth:

3> when there exists a UL CA combination in which one or more measurement objects affected by IDC problems are configured in ul-CA-AssistanceInfo, include affectedCarrierFreqCombList;

2> otherwise (i.e., when the UE does not configure victimSystemType as wlan or Bluetooth):

3> when there exists a UL CA combination in which one or more measurement objects affected by IDC problems are configured in ul-CA-AssistanceInfo, optionally include affectedCarrerFreqCombList;

1> when the UE is configured to provide UL DC information and there exists a UL DC combination in which one or more measurement objects affected by IDC problems are configured:

2> include victimSystemType in ul-DC-AssistanceInfo;

2> when the UE configures victimSystemType as wlan or Bluetooth:

3> when there exists a UL DC combination in which one or more measurement objects affected by IDC problems are configured in ul-DC-AssistanceInfo, include affectedCarrierFreqCombList;

2> otherwise (i.e., when the UE does not configure victimSystemType as wlan or Bluetooth):

3> when there exists a UL DC combination in which one or more measurement objects affected by IDC problems are configured in ul-DC-AssistanceInfo, optionally include affectedCarrierFreqCombList;

1> when the UE is configured to provide UL BWP information and there exists a UL BWP combination in which one or more measurement objects affected by IDC problems:

2> include victimSystemType in ul-BWP-AssistanceInfo;

2> when the UE configures victimSystemType as wlan or Bluetooth:

3> when there exists a UL BWP combination in which one or more measurement objects affected by IDC problems are configured in ul-BWP-AssistanceInfo, include affectedCarrierFreqCombList;

2> otherwise (i.e., when the UE does not configure victimSystemType as wlan or Bluetooth)::

3> when there exists a UL BWP combination in which one or more measurement objects affected by IDC problems are configured in ul-BWP-AssistanceInfo, optionally include affectedCarrierFreqCombList;

1> when the UE is configured to provide UL SUL information and there exists a UL SUL combination in which one or more measurement objects affected by IDC problems are configured:

2> include victimSystemType in ul-SUL-AssistanceInfo;

2> when the UE configures victimSystemType as wlan or Bluetooth:

3> when there exists a UL SUL combination in which one or more measurement objects affected by IDC problems are configured in ul-SUL-AssistanceInfo, include affectedCarrierFreqCombList;

2> otherwise (i.e., when the UE does not configure victimSystemType as wlan or Bluetooth):

3> when there exists a UL SUL combination in which one or more measurement objects affected by IDC problems are configured in ul-SUL-AssistanceInfo, optionally include affectedCarrerFreqCombList;

1> when idc-HardwareSharingIndicationEutra is configured, and the UE undergoes a hardware problem that may not be solved by the UE itself on an E-UTRA carrier frequency for which one or more measurement objects are configured:

2> include and appropriately set hardwareSharingProblem;

1> when idc-HardwareSharingIndicationNR is configured, and the UE undergoes a hardware problem that may not be solved by the UE itself on an NR carrier frequency for which one or more measurement objects are configured:

2> include and appropriately set hardwareSharingProblem;

FIG. 2C is a block diagram illustrating a structure of a terminal according to some embodiments.

Referring to FIG. 2C, a terminal may include a transceiver 2c-10, a memory 2c-20, and a processor 2c-30. According to a communication method of the terminal, the transceiver 2c-10, the memory 2c-20, and the processor 2c-30 may operate. However, elements of the terminal are not limited thereto. For example, the terminal may include more or fewer elements than those illustrated in FIG. 2C. In addition, the transceiver 2c-10, the memory 2c-20, and the processor 2c-30 may be implemented as one chip.

The transceiver 2c-10 may transmit/receive a signal to/from a base station. The signal may include control information and data. To this end, the transceiver 2c-10 may include a radio frequency (RF) transmitter that up-converts and amplifies a frequency of a transmitted signal, and an RF receiver that performs low-noise amplification on a received signal and down-converts a frequency. However, this is merely an example, and elements of the transceiver 2c-10 are not limited to the RF transmitter and the RF receiver.

Also, the transceiver 2c-10 may receive a signal through a wireless channel and may output a signal to the processor 2c-30, and may transmit a signal output from the processor 2c-30 through the wireless channel.

The memory 2c-20 may store a program and data required to operate the terminal. Also, the memory 2c-20 may store control information or data included in a signal obtained by the terminal. The memory 2c-20 may include a storage medium such as a read-only memory (ROM), a random-access memory (RAM), a hard disk, a compact disk (CD)-ROM, or a digital versatile disk (DVD), or a combination thereof.

The processor 2c-30 may control a series of processes so that the terminal operates according to the above embodiments. According to some embodiments, the processor 2c-30 may control elements of the terminal to, based on information included in a synchronization signal block (SSB) received through the transceiver 2c-10 from the base station, determine a transmission period of a synchronization signal, a synchronization signal offset, and a window duration of the SSB and perform synchronization.

Also, the processor 2c-30 may control elements of the terminal to determine whether an IDC problem occurs based on information for configuring a dual connectivity (DC), bandwidth part (BWP), or supplementary uplink (SUL)-related IDC report included in an idc-Config message included in an RRCConfiguration signal received from the base station, and when it is determined that an IDC problem occurs, generate a report signal including information on the IDC problem, and transmit the report signal to the base station.

Figure 2D:
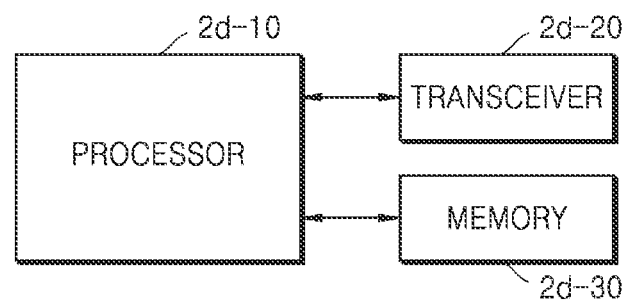
FIG. 2D is a block diagram illustrating a structure of a base station according to some embodiments.

FIG. 2D is a block diagram illustrating a structure of a base station according to some embodiments.

Referring to FIG. 2D, a base station may include a transceiver 2d-10, a memory 2d-20, and a processor 2d-30. According to a communication method of the base station, the transceiver 2d-10, the memory 2d-20, and the processor 2d-30 may operate. However, elements of the base station are not limited thereto. For example, the base station may include more or fewer elements than those illustrated in FIG. 2D. In addition, the transceiver 2d-10, the memory 2d-20, and the processor 2d-30 may be implemented as one chip.

The transceiver 2d-10 may transmit/receive a signal to/from a terminal. The signal may include control information and data. To this end, the transceiver 2d-10 may include an RF transmitter that up-converts and amplifies a frequency of a transmitted signal, and an RF receiver that performs low-noise amplification on a received signal and down-converts a frequency. However, this is merely an example, and elements of the transceiver 2d-10 are not limited to the RF transmitter and the RF receiver.

Also, the transceiver 2d-10 may receive a signal through a wireless channel and may output a signal to the processor 2d-30, and may transmit a signal output from the processor 2d-30 through the wireless channel.

The memory 2d-20 may store a program and data required to operate the base station. Also, the memory 2d-20 may store control information or data included in a signal obtained by the base station. The memory 2d-20 may include a storage medium such as a ROM, a RAM, a hard disk, a CD-ROM, or a DVD, or a combination thereof.

The processor 2d-30 may control a series of processes so that the base station operates according to the above embodiments. According to some embodiments, the processor 2d-30 may control elements of the base station to configure a synchronization signal block (SSB) burst length having a specific length of time in relation to SSB transmission, configure a window duration including a plurality of durations having the SSB burst length as a unit, configure a point of time when an SSB is transmitted within the plurality of durations, perform listen-before-talk (LBT), and when the LBT succeeds, transmit the SSB to the terminal based on a point of time when the LBT succeeds and the configured point of time when the SSB is transmitted within the plurality of durations.

Also, the processor 2d-30 may control elements of the base station to transmit an RRCConfiguration signal including an idc-Config message to the terminal.

The present disclosure may, however, be embodied in different forms and should not be construed as limited to embodiments of the present disclosure set forth herein; rather, these embodiments of the present disclosure are provided so that this disclosure is thorough and complete. That is, it will be obvious to one of ordinary skill in the art that various modifications may be made based on the technical scope of the present disclosure. Also, embodiments of the present disclosure may be combined and implemented. For example, parts of embodiments (e.g., embodiment 1, embodiment 2, and embodiment 3) of the present disclosure may be combined with one another to enable a base station and a terminal to operate. Also, although an NR system is described in the above embodiments, other modifications based on the technical scope of the embodiments may be made, and embodiments of the present disclosure may also be applied to other systems such as frequency-division duplexing (FDD) or time-division duplexing (TDD) LTE systems.

While the present disclosure has been particularly shown and described with reference to exemplary embodiments thereof by using specific terms, the embodiments and terms have merely been used to explain the present disclosure and should not be construed as limiting the scope of the present disclosure. That is, it will be obvious to one of ordinary skill in the art that various modifications may be made based on the technical scope of the present disclosure.

The invention claimed is:

1. An operating method of a base station for transmitting and receiving a synchronization signal, the operating method comprising:
 performing listen-before-talk (LBT) on a channel of a terminal in an unlicensed band;
 in case that the LBT succeeds within a window duration for transmitting a synchronization signal block (SSB), transmitting, to the terminal, a reservation signal indicating that the base station is to occupy the channel from a point of time when a first SSB burst length of at least one SSB burst length starts; and
 transmitting, to the terminal, the SSB at a specific time within the first SSB burst length,
 wherein the window duration comprises the at least one SSB burst length that is repeated in a specific period and has the specific period as a length of time,
 wherein the reservation signal comprises identification information of the base station and information on the point of time when the first SSB burst length starts, and
 wherein the SSB comprises information on the length of time of the window duration, information on the specific period of the SSB burst length, information indicating that the first SSB burst length is an $n^{th}$ SSB burst length of the at least one SSB burst length, and information on the specific time at which the SSB is transmitted within the first SSB burst length.

2. The operating method of claim 1, further comprising, after the LBT succeeds, transmitting a signal for allowing the base station to occupy the channel to the terminal until the first SSB burst length starts.

3. The operating method of claim 2, wherein the signal for occupying the channel comprises at least one of a noise signal, a broadcasting signal, or a data signal.

4. The operating method of claim 1, wherein the length of time of the window duration is a multiple of the specific period of the SSB burst length.

5. An operating method of a terminal for transmitting and receiving a synchronization signal, the operating method comprising:
 receiving, from a base station that succeeds in listen-before-talk (LBT) performed on a channel of the terminal in an unlicensed band within a window duration for transmitting a synchronization signal block (SSB), a reservation signal indicating that the base station is to occupy the channel from a point of time when a first SSB burst length of at least one SSB burst length starts;
 receiving the SSB, from a base station, at a specific time within the first SSB burst length; and
 performing synchronization with the base station, based on the SSB,
 wherein the window duration comprises the at least one SSB burst length that is repeated in a specific period and has the specific period as a length of time,
 wherein the reservation signal comprises identification information of the base station and information on the point of time when the first SSB burst length starts, and
 wherein the SSB comprises information on the length of time of the window duration, information on the specific period of the SSB burst length, information indicating that the first SSB burst length is an $n^{th}$ SSB burst length of the at least one SSB burst length, and information on the specific time at which the SSB is transmitted within the first SSB burst length.

6. The operating method of claim 5, further comprising, receiving, from the base station that succeeds in the LBT, a signal for allowing the base station to occupy the channel until the first SSB burst length starts.

7. The operating method of claim 5, wherein the length of time of the window duration is a multiple of the specific period of the SSB burst length.

8. A base station for transmitting and receiving a synchronization signal, the base station comprising:
 a transceiver; and
 at least one processor connected to the transceiver, and configured to:
  perform listen-before-talk (LBT) on a channel of a terminal in an unlicensed band,
  in case that the LBT succeeds within a window duration for transmitting a synchronization signal block (SSB), transmit, to the terminal, a reservation signal indicating that the base station is to occupy the channel from a point of time when a first SSB burst length of at least one SSB burst length starts, and
  transmit, to the terminal, the SSB at a specific time within the first SSB burst length,
 wherein the window duration comprises the at least one SSB burst length that is repeated in a specific period and has the specific period as a length of time,
 wherein the reservation signal comprises identification information of the base station and information on the point of time when the first SSB burst length starts, and
 wherein the SSB comprises information on the length of time of the window duration, information on the specific period of the SSB burst length, information indicating that the first SSB burst length is an $n^{th}$ SSB burst length of the at least one SSB burst length, and information on the specific time at which the SSB is transmitted within the first SSB burst length.

9. A terminal for transmitting and receiving a synchronization signal, the terminal comprising:
 a transceiver; and
 at least one processor connected to the transceiver, and configured to:
  receive, from a base station that succeeds in listen-before-talk (LBT) performed on a channel of the terminal in an unlicensed band within a window duration for transmitting a synchronization signal block (SSB), a reservation signal indicating that the base station is to occupy the channel from a point of time when a first SSB burst length of at least one SSB burst length starts, and
  receive the SSB, from a base station, at a specific time within the first SSB burst length; and
  performing synchronization with the base station, based on the SSB,
 wherein the window duration comprises the at least one SSB burst length that is repeated in a specific period and has the specific period as a length of time,
 wherein the reservation signal comprises identification information of the base station and information on the point of time when the first SSB burst length starts, and
 wherein the SSB comprises information on the length of time of the window duration, information on the specific period of the SSB burst length, information indicating that the first SSB burst length is an $n^{th}$ SSB burst length of the at least one SSB burst length, and information on the specific time at which the SSB is transmitted within the first SSB burst length.

* * * * *